US012032972B2

(12) United States Patent
Litvinov et al.

(10) Patent No.: US 12,032,972 B2
(45) Date of Patent: Jul. 9, 2024

(54) METHODS, APPARATUS, AND ARTICLES OF MANUFACTURE TO IMPROVE PERFORMANCE OF A COMPUTE DEVICE BY DETECTING A SCENE CHANGE

(71) Applicant: Intel Corporation, Santa Clara, CA (US)

(72) Inventors: Anatoly Litvinov, Binyamina (IL); Ilya Sister, Haifa (IL); Andrey Semenjatshenco, Giv'atayim (IL); Nir Gerber, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/829,315

(22) Filed: May 31, 2022

(65) Prior Publication Data

US 2022/0291930 A1    Sep. 15, 2022

(51) Int. Cl.
| | | |
|---|---|---|
| G06F 1/24 | (2006.01) | |
| G06F 1/3296 | (2019.01) | |
| G06F 9/00 | (2018.01) | |
| G06F 9/445 | (2018.01) | |
| G06F 11/34 | (2006.01) | |

(Continued)

(52) U.S. Cl.
CPC ........ G06F 9/44505 (2013.01); G06F 1/3296 (2013.01); G06F 11/3409 (2013.01); G06V 10/62 (2022.01); G06V 10/761 (2022.01); G06V 10/758 (2022.01)

(58) Field of Classification Search
CPC ............... G06F 9/44505; G06F 1/3296; G06F 11/3409; G06F 1/1605; G06F 1/1686; G06F 1/26; G06F 1/3215; G06F 1/3231; G06F 1/3246; G06F 11/3438; G06V 10/62;

(Continued)

(56) References Cited

U.S. PATENT DOCUMENTS 10,176,198 B1 * 1/2019 Dhua .................... G06V 10/761
10,242,447 B2 * 3/2019 Rastgar .................. G06F 18/22

(Continued)

OTHER PUBLICATIONS

GM's Blog, "3A Algorithms in Digital Cameras," retrieved from [https://gimoonnam.github.io/imageprocessing/3A-initiation/], updated Aug. 22, 2020, 5 pages.

(Continued)

*Primary Examiner* — Xuxing Chen
(74) *Attorney, Agent, or Firm* — HANLEY, FLIGHT & ZIMMERMAN, LLC

(57) ABSTRACT

Methods, apparatus, systems, and articles of manufacture are disclosed to improve performance of a compute device by detecting a scene change. An example apparatus includes scene change detection circuitry and interrupt circuitry. The example scene change detection circuitry is to determine a first score value for a first metric of similarity between a first image of a field of view (FOV) of an image sensor and a second image of the FOV, determine a second score value for a second metric of similarity between the first image and the second image, and compute a composite score value based on the first score value and the second score value. The example interrupt circuitry is to generate an interrupt to processor circuitry of the compute device to cause the processor circuitry to adjust a computation condition of the compute device based on the composite score.

25 Claims, 9 Drawing Sheets

(51) Int. Cl.
*G06V 10/62* (2022.01)
*G06V 10/74* (2022.01)
*G06V 10/75* (2022.01)

(58) Field of Classification Search
CPC .... G06V 10/761; G06V 10/758; G06V 10/74; G06V 20/52
See application file for complete search history.

(56) References Cited

U.S. PATENT DOCUMENTS

| | | | |
|---|---|---|---|
| 11,663,805 B1* | 5/2023 | Tang | G06V 40/12 382/115 |
| 2017/0060227 A1* | 3/2017 | Park | H04N 1/00517 |
| 2017/0351710 A1* | 12/2017 | Zhu | G06F 16/24578 |
| 2019/0130202 A1* | 5/2019 | Doumbouya | G06V 40/103 |
| 2021/0073890 A1* | 3/2021 | Lee | G06N 20/20 |
| 2021/0181847 A1* | 6/2021 | Noh | G06F 3/0412 |
| 2021/0211574 A1* | 7/2021 | Song | H04N 23/667 |
| 2021/0256254 A1* | 8/2021 | Takahashi | G06F 18/22 |
| 2022/0358327 A1* | 11/2022 | Lee | G06V 10/74 |
| 2023/0029132 A1* | 1/2023 | Imai | G06F 9/445 |
| 2023/0177807 A1* | 6/2023 | Solmaz | G06Q 30/02 382/209 |
| 2023/0206629 A1* | 6/2023 | Mullett | G06V 20/30 382/159 |
| 2023/0215128 A1* | 7/2023 | Ranganathan | G06V 10/273 382/103 |
| 2023/0281984 A1* | 9/2023 | Gustof | G06V 10/945 382/209 |

OTHER PUBLICATIONS

Android Open Source Project, "3A Modes and State Transition," retrieved from [https://source.android.com/devices/camera/camera3_3Amodes], updated Aug. 16, 2021, 16 pages.

Wikipedia, "Bayer Filter," retrieved from [https://en.wikipedia.org/w/index.php?title=Bayer_filter&oldid=1080626239], last edited on Apr. 2, 2022, 11 pages.

Wikipedia, "Image Processor," retrieved from [https://en.wikipedia.org/w/index.php?title=Image_processor&oldid=1068476506], last edited on Jan. 28, 2022, 5 pages.

Fan, Jianping, "ISP: Image Signal Processing," Department of Computer Science, UNC-Charlotte, retrieved from [http://webpages.uncc.edu/jfan/itcs5152.html], Jan. 23, 2020, 152 pages.

Wikipedia, "Sum of Absolute Differences, " retrieved from [https://en.wikipedia.org/w/index.php?title=Sum_of_absolute_differences&oldid=1021802130], last edited on May 6, 2021, 3 pages.

Wang et al., "Image Quality Assessment: From Error Visibility to Structural Similarity," IEEE Transactions on Image Processing, vol. 13, No. 4, Apr. 2004, 14 pages.

Kumar, Prabu, "What is a MIPI Camera? How does a MIPI Camera Work?" e-con Systems, Nov. 4, 2021, 15 pages.

* cited by examiner

METHODS, APPARATUS, AND ARTICLES OF MANUFACTURE TO IMPROVE PERFORMANCE OF A COMPUTE DEVICE BY DETECTING A SCENE CHANGE

FIELD OF THE DISCLOSURE

This disclosure relates generally to device management and, more particularly, to methods, apparatus, and articles of manufacture to improve performance of a compute device by detecting a scene change.

BACKGROUND

Compute devices can consume relatively large amounts of energy when executing computationally intensive tasks. Power management tools may be deployed to such compute devices to manage energy expenditure and/or extend battery life. Wasteful and/or unnecessary energy consumption by a compute device can unintentionally occur when a user steps away from the compute device and/or is otherwise no longer present near the compute device.

Figure 1:
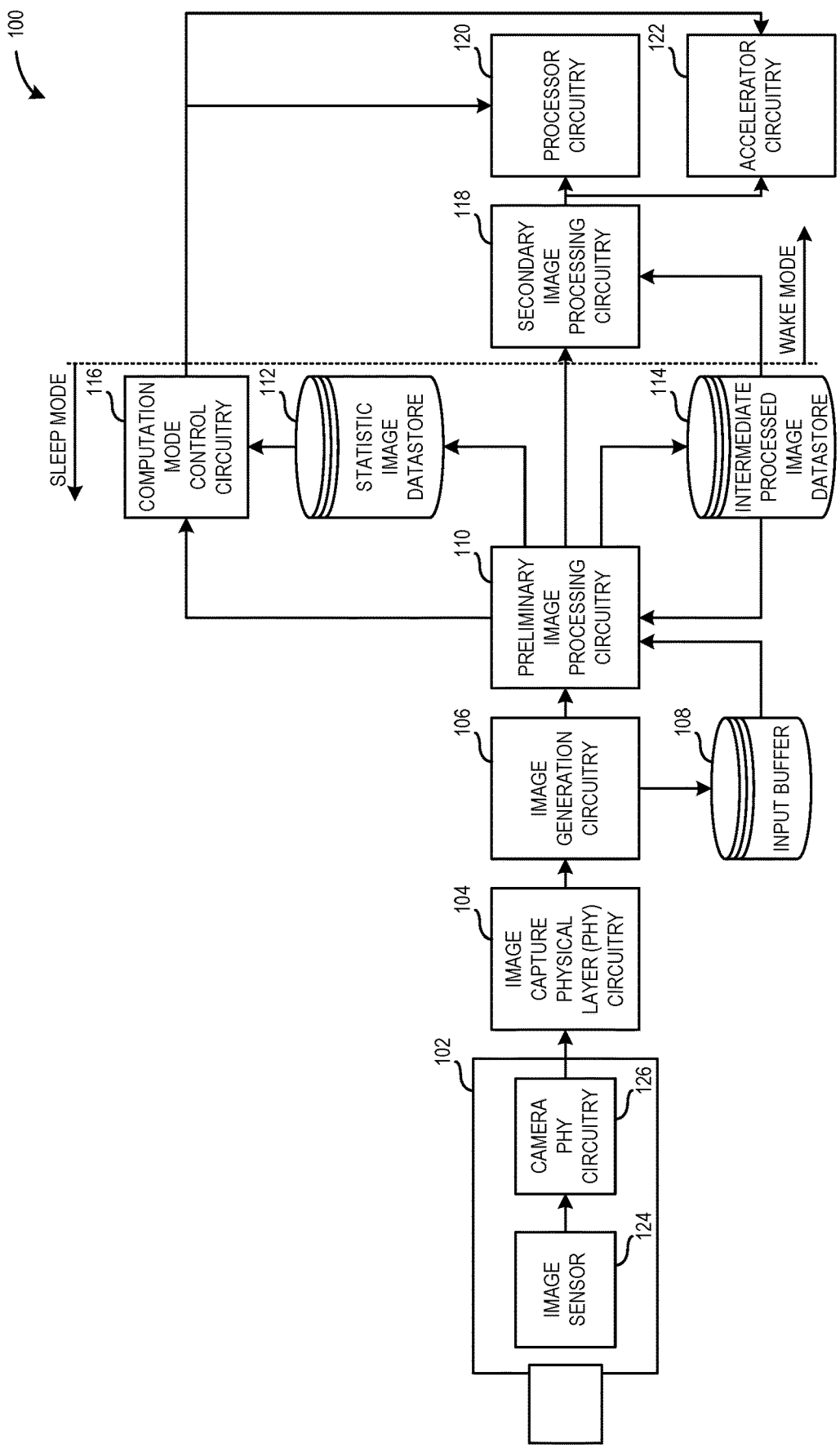
FIG. 1 is a block diagram illustrating an example image signal processing (ISP) pipeline of a compute device.

In general, the same reference numbers will be used throughout the drawing(s) and accompanying written description to refer to the same or like parts. The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" modifies its subjects/values to recognize the potential presence of variations that occur in real world applications. For example, "approximately" may modify dimensions that may not be exact due to processing errors and/or other real world imperfections as will be understood by persons of ordinary skill in the art. For example, "approximately" may indicate that such dimensions may be within a tolerance range of +/−10%. For example, an image that is approximately 100×100 pixels in size may vary by 10% or up to 1,000 pixels. As such, a 100×100 pixel image, a 93×102 pixel image, a 104×92 pixel image, a 103×106 pixel image, and a 115×95 pixel image are all approximately 100×100 pixel images. In additional or alternative examples, "approximately" may indicate that such dimension may be within any other tolerance range.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s). In some examples an ASIC may be referred to as Application Specific Integrated Circuitry.

DETAILED DESCRIPTION

Compute devices can consume relatively large amounts of energy when executing computational tasks. Power management tools may be deployed on compute devices (e.g., on compute devices that are energy limited, such as compute devices that are battery powered). Such power management tools may manage energy expenditure and/or otherwise extend battery life. For example, a host operating system (OS) running on and/or otherwise executed by a central processor unit (CPU) of a compute device may reduce a brightness of a display panel or device to reduce energy consumption. In other examples, the host OS can turn off the display panel when a user (e.g., a human, a human user, etc.) steps away from the compute device and is no longer present in front of the display panel. Such examples may be referred to as transitioning from a wake mode of operation to a sleep mode of operation.

Some compute devices implement an "always on" or "fast boot" feature in which the "always on" feature seeks to give users the impression that a compute device is always on. For example, one "always on" approach is not to transition to the sleep mode of operation and for a compute device to always remain in the wake mode of operation (e.g., to actually always be on). The compute device remains in the wake mode of operation and, therefore, wastes significant power even when a user is not present at the compute device. Another approach is to transition the compute device from the sleep mode of operation to the wake mode of operation (e.g., wake up) upon request, such as a user interacting with an interface (e.g., a touchpad, a touchscreen, a mouse, etc.) of a compute device. However, requiring user interaction to wake up the compute device increases the boot time required to wake up the compute device.

Yet another approach utilizes human presence sensors (HPSs) to detect whether a human is proximate to a display panel of a compute device. For example, a human is considered proximate to a display panel when the human is in front of the display panel or within a range (e.g., a range of 6 inches to 6 feet, a range of 0 to 5 feet, etc.) and/or angle (e.g., an angle of 5 degrees from a center point of the display, an angle of 30 degrees from the center point, etc.) of the display panel from which the HPS can detect the presence of the human. For example, the HPS can detect the human in response to the human being in a vicinity of the display panel that is within a threshold range of the HPS. After an HPS detects the presence of a human, an image processor unit (IPU) or other processor circuitry may conduct additional processing to allow the compute device to interact with the human. For example, the IPU executes computer vision algorithms, such as facial detection, and/or execute autofocus (AF), autoexposure (AE), and/or auto white balance (AWB) (collectively "3A") algorithms.

An HPS can be based on one or more different sensing techniques or technologies. For example, an HPS can be an infrared sensor, a time-of-flight laser sensor, an ultrasonic sensor, a millimeter wave radar sensor, or a camera or camera-based sensor. An example camera-based HPS may be implemented by a microchip that analyzes a high-quality image captured by the compute device using software and/or artificial intelligence (AI). Such camera-based sensors are typically implemented in a separate package from an IPU or other processor circuitry that conducts more complex processing. Additionally, such camera-based sensors significantly increase the monetary cost of materials when included in compute devices.

Compute devices implementing HPSs can achieve the "always on" effect despite the fact that the compute devices may transition between the wake mode of operation and the sleep mode of operation. However, because compute devices may be resource constrained, regulating power consumption is a concern (e.g., to avoid excessively draining battery life to implement the "always on" feature). For example, such compute devices reduce power consumption by transitioning to the sleep mode of operation immediately when a user is no longer using (e.g., steps away from) the compute devices while transitioning to the wake mode of operation in advance of the user resuming use of the compute devices (e.g., to reduce boot time).

Existing approaches achieve the "always on" effect but still consume significant power. For example, while compute devices that always remain in the wake mode of operation do not require a wake-up process, this approach is untenable in mobile devices where power consumption significantly impacts performance due to the resource-constrained nature of mobile devices. In contrast, while compute devices that wake up on request may reduce power consumption, such compute devices are very slowly to respond to user requests and provide an undesirable user experience. Additionally, using an HPS, such as a camera-based sensor described above, is very expensive (e.g., in terms of the monetary cost of materials), and therefore impractical for industry adoption.

Examples disclosed herein achieve the "always on" effect while also reducing power consumption of compute devices. For example, disclosed examples utilize low-resolution (e.g., 3A statistic) images to achieve the "always on" effect, improve user experience, and reduce power consumption of compute devices. Many existing compute devices include an integrated camera to capture a raw image, image processing circuitry to convert the raw image into a high-quality image, and an IPU to conduct complex processing on the high-quality image. Examples disclosed herein improve existing compute devices by, for example, detecting a scene change in reduced-quality images captured by the camera. Example scene changes corresponds to an appearance of a person or movement in the scene, among others. Examples disclosed herein detect the scene change based on the collection and analysis of one or more low-resolution (e.g., statistic) images. Example implementations of disclosed examples include hardware accelerator circuitry, a CPU executing instructions, and a microcontroller executing instructions, among others.

Based on the analysis, examples disclosed herein trigger processor circuitry of the compute device to change a computation condition of the compute device. For example, when a compute device is in the sleep mode of operation (e.g., in a power save mode), disclosed examples cause the compute device to wake up and provides the "always on" effect to the user. For example, in the sleep mode of operation, processor circuitry of a compute device is configured to operate at a reduced clock speed (e.g., is slowed down), memory of the compute device is configured to operate with reduced power (e.g., in a minimum power state), displays associated with the compute device are turned off, and/or peripheral devices (including displays) connected to the compute device are turned off, among others. Such configurations reduce the computational burden on the compute device and save power (e.g., reduce power consumption). For example, when in the sleep mode of operation, because peripheral devices (including displays) are turned off or are otherwise configured to be inactive, the compute device saves on processor cycles that would otherwise be dedicated to monitoring and/or controlling such peripheral devices.

Additionally, because examples disclosed herein process one or more low-resolution or reduced-quality images (e.g., statistic images), examples disclosed herein reduce (1) load on a CPU of compute devices and (2) power consumption of compute devices. For example, processing higher quality images requires more processor cycles than processing reduced-quality images (e.g., statistic images). Additionally, executing more processor cycles increases power consumption. Furthermore, examples disclosed herein include example hardware circuitry structured to implement disclosed examples. Such example hardware circuitry offloads computation from a CPU of a compute device and implements that computation more efficiently than the CPU.

Additionally or alternatively, by detecting when a scene has changed, examples disclosed herein cause a compute device to reduce power consumption. For example, disclosed examples detect a static, unchanging scene and cause processer circuitry of a compute device to alter a computation condition of the compute device to avoid execution of complex image processing algorithms (e.g., 3A algorithms, computer vision algorithms, etc.). Conversely, once a compute device has woken up, existing approaches do not consider whether the scene is static or changing and execute complex image processing algorithms (e.g., 3A algorithms, computer vision algorithms, etc.) when in the wake mode of operation. Examples disclosed herein avoid such processing for static scenes and, as such, save significant power.

FIG. 1 is a block diagram illustrating an example ISP pipeline 100 of a compute device. The ISP pipeline 100 includes an example camera 102, example image capture physical layer (PHY) circuitry 104, example image generation circuitry 106, an example input buffer 108, example preliminary image processing circuitry 110, an example statistic image datastore 112, an example intermediate processed image datastore 114, example computation mode control circuitry 116, example secondary image processing circuitry 118, example processor circuitry 120, and example accelerator circuitry 122. In the example of FIG. 1, the image capture PHY circuitry 104, the image generation circuitry 106, the preliminary image processing circuitry 110, the computation mode control circuitry 116, and the secondary image processing circuitry 118 may be implemented by a System-on-a-Chip (SoC) (e.g., an IPU SoC).

In the illustrated example of FIG. 1, the camera 102 is coupled to the image capture PHY circuitry 104. In the example of FIG. 1, the camera 102 is implemented by an embedded camera situated on a System-on-a-Chip (SoC) including the image capture PHY circuitry 104, the image generation circuitry 106, the preliminary image processing circuitry 110, the computation mode control circuitry 116, and the secondary image processing circuitry 118. For example, the camera 102 of FIG. 1 is an embedded camera compliant with the Mobile Industry Processor Interface (MIPI) specification (e.g., a MIPI camera). In additional or alternative examples, the camera 102 is compliant with other specifications such as the inter-integrated circuit (I2C) specification or the universal serial bus (USB) type-C (USB-C) specification, among others. In some examples, the example SoC including the camera 102, the image capture PHY circuitry 104, the image generation circuitry 106, the preliminary image processing circuitry 110, the computation mode control circuitry 116, and the secondary image processing circuitry 118 can include more or fewer components than illustrated and described in connection with FIG. 1.

While the camera 102 of FIG. 1 is an embedded camera on the SoC (e.g., the IPU SoC), in some examples, the camera 102 is external to the SoC (e.g., the IPU SoC). For example, the camera 102 is implemented as an external device connected to the compute device by a cable (e.g., a USB-C camera connected to the compute device via a USB-C cable). In additional or alternative examples, the camera 102 is implemented as part of a microchip, an ASIC, or an FPGA as a separate device (e.g., a standalone MIPI camera) that is separate from the SoC (e.g., the CPU and associated circuitry) of the compute device.

In the illustrated example of FIG. 1, the camera 102 includes an example image sensor 124 and example camera PHY circuitry 126 to transmit images captured by the camera 102 to circuitry of the ISP pipeline 100. For example, the image sensor 124 of the camera 102 captures one or more images for a sampling interval and the camera PHY circuitry 126 of the camera 102 formats the one or more images into respective groups of one or more frames to be transmitted to the image capture PHY circuitry 104. In the example of FIG. 1, the image sensor 124 of the camera 102 is implemented by an array of photodiodes covered by a Bayer filter mosaic. In the example of FIG. 1, the camera PHY circuitry 126 of the camera 102 formats the one or more frames of an image into one or more packets and transmits the one or more packets to the image capture PHY circuitry 104. In some examples, to capture an image for a sampling interval, the image sensor 124 of the camera 102 captures a single image during the sampling interval. In additional or alternative examples, the image sensor 124 of the camera 102 captures more than one image during the sampling interval and combines the more than one images to generate a single image for the sampling interval.

In the illustrated example of FIG. 1, the image capture PHY circuitry 104 is coupled to the camera 102 and the image generation circuitry 106. In the example of FIG. 1, the camera PHY circuitry 126 and the image capture PHY circuitry 104 are implemented by D-PHY circuitry. In additional or alternative examples, the camera PHY circuitry 126 and/or the image capture PHY circuitry 104 are implemented by other PHY circuitry such as M-PHY circuitry or C-PHY circuitry, among others.

In the illustrated example of FIG. 1, the image capture PHY circuitry 104 processes one or more packets received from the camera 102 to extract raw image data. In the example of FIG. 1, camera 102 is a MIPI camera. As such, the image capture PHY circuitry 104 complies with the MIPI specification. In additional or alternative examples, the image capture PHY circuitry 104 complies with other specifications (e.g., I2C, USB-C, etc.). In some examples, the image capture PHY circuitry 104 may be referred to as interface circuitry as the image capture PHY circuitry 104 acts as an interface between the camera 102 and circuitry of the ISP pipeline 100.

In the illustrated example of FIG. 1, the image generation circuitry 106 is coupled to the image capture PHY circuitry 104, the input buffer 108, and the preliminary image processing circuitry 110. In the example of FIG. 1, the image generation circuitry 106 is implemented by one or more electronic circuits. In some examples, the image generation circuitry 106 is implemented by processor circuitry executing instructions. In the example of FIG. 1, the image generation circuitry 106 processes raw image data received from the image capture PHY circuitry 104 to generate a raw image of the field of view (FOV) of the image sensor 124 of the camera 102. For example, the image generation circuitry 106 processes the raw image data on a frame-by-frame basis to generate a raw image of the FOV of the image sensor 124 of the camera 102.

In the illustrated example of FIG. 1, the raw image is a Bayer formatted image. In additional or alternative examples, the raw image is a monochrome formatted image, an infrared formatted image, or a YUV formatted image, among others. After generating a raw image, the image generation circuitry 106 causes storage of the raw image in the input buffer 108 and/or communicates the raw image to the preliminary image processing circuitry 110. In the example of FIG. 1, the input buffer 108 is coupled to the image generation circuitry 106 and the preliminary image processing circuitry 110. The example input buffer 108 of FIG. 1 is implemented by one or more Dynamic Random Access Memory (DRAM) memories. The input buffer 108 is configured to store one or more raw images. The input buffer 108 stores raw images at any desired resolution. For example, the input buffer 108 stores raw images with 8 bits per channel (BPC) (e.g., red, green, blue), 10 BPC, 12 BPC, 16 BPC, 20 BPC, or 24 BPC, among others.

In the illustrated example of FIG. 1, the preliminary image processing circuitry 110 is coupled to the image generation circuitry 106, the input buffer 108, the statistic image datastore 112, the intermediate processed image datastore 114, the computation mode control circuitry 116, and the secondary image processing circuitry 118. In the example of FIG. 1, the preliminary image processing circuitry 110 is implemented by one or more electronic circuits (e.g., as hardware accelerator circuitry in the IPU SoC). In some examples, the preliminary image processing circuitry 110 is implemented by processor circuitry executing instructions.

In the illustrated example of FIG. 1, the preliminary image processing circuitry 110 executes one or more image processing algorithms to transform raw images to intermediate processed images. For example, the preliminary image processing circuitry 110 executes one or more Bayer transformation algorithms to remove optical black values from pixel values in raw images, autofocus the raw images, white balance the raw images (e.g., auto white balancing), correct bad pixel values in the raw images, correct for lens shading in the raw images, adjust the exposure of the raw image (e.g., autoexposure), and correct for noise in the raw images. The output of the one or more Bayer transformation algorithms is an intermediate processed image. The example preliminary image processing circuitry 110 also extracts 3A settings (e.g., exposure time, focus length, white balance gains, etc.) for use when processing subsequent raw images. For example, the 3A settings are used by circuitry in the ISP pipeline 100 to achieve processed images at desired brightness level, focus, and color.

In the illustrated example of FIG. 1, after generating an intermediate processed image, the preliminary image processing circuitry 110 causes storage of the intermediate processed image in the intermediate processed image datastore 114 and/or communicates the intermediate processed image to the secondary image processing circuitry 118. In the example of FIG. 1, the intermediate processed image datastore 114 is coupled to the preliminary image processing circuitry 110 and the secondary image processing circuitry 118. The example intermediate processed image datastore 114 of FIG. 1 is implemented by one or more DRAM memories. The intermediate processed image datastore 114 is configured to store one or more intermediate processed images.

In the illustrated example of FIG. 1, the preliminary image processing circuitry 110 additionally generates 3A statistics (e.g., AE histogram(s), estimation(s) of local pixel saturation, etc.). To generate 3A statistics, the preliminary image processing circuitry 110 coarsely downscales the raw image to very a small size (e.g., approximately a 40×50 pixel image, approximately an 80×60 pixel image, etc.). In this manner, the coarsely downscaled images have a low-resolution (e.g., a coarse resolution, approximately a 40×50 pixel image, approximately an 80×60 pixel image, etc.) relative to a resolution of the image sensor 124 (e.g., a fine resolution, 720p, 1080p, 4K, 8K, etc.). In some examples, the low-resolution image (e.g., coarsely downscaled from the resolution of the raw image) is referred to as a statistic image.

In examples disclosed herein, such low-resolution images (e.g., statistic images) are approximately 80×60 pixel images. However, in additional or alternative examples, low-resolution images (e.g., statistic images) may be different sizes. For example, disclosed examples may utilize a full-sized image from early in the ISP pipeline 100 (e.g., the raw image) to detect scene changes and/or execute other image processing. In some examples, disclosed examples may utilize a cropped version of the full-sized image (e.g., a cropped version of the full-sized image that excludes the periphery of the image and limits the cropped version to the center of the FOV of the image sensor 124). An example developer may determine to use differently sized images based on a tradeoff between (1) the size of the images, which contributes to accuracy, and (2) resource consumption, including computational resource and power consumption, associated with processing the images. For example, a larger image results in improved accuracy for detecting scene changes and/or other processing as compared to a smaller image, but a larger image causes more power consumption and/or additional processor cycles to process the image than a smaller image.

In the illustrated example of FIG. 1, statistic images are generated early in the ISP pipeline 100 as compared to processed images that are presented to users of the compute device. For example, statistic images are typically only processed to downscale the raw images, to remove optical black values from pixel values in the raw images, and, in some examples, to correct for lens shading in the raw images. The preliminary image processing circuitry 110 generates 3A statistics using the statistic image (e.g., low-resolution image).

In the illustrated example of FIG. 1, after generating a statistic image, the preliminary image processing circuitry 110 causes storage of the statistic image and/or 3A statistics for the statistic image in the statistic image datastore 112 and/or communicates the statistic image and/or 3A statistics for the statistic image to the computation mode control circuitry 116. In the example of FIG. 1, the statistic image datastore 112 is coupled to the preliminary image processing circuitry 110 and the computation mode control circuitry 116. The example statistic image datastore 112 of FIG. 1 is implemented by one or more DRAM memories. The statistic image datastore 112 is configured to store one or more statistic images and/or 3A statistics associated with the one or more statistic images.

In the illustrated example of FIG. 1, the computation mode control circuitry 116 is coupled to the preliminary image processing circuitry 110, the statistic image datastore 112, the processor circuitry 120, and the accelerator circuitry 122. In the example of FIG. 1, the computation mode control circuitry 116 is implemented by processor circuitry and is described further below. The example computation mode control circuitry 116 accesses a first statistic image (e.g., low-resolution image) for a first sampling interval of the image sensor 124 of the camera 102 and a second statistic image (e.g., low-resolution image) for a second sampling interval of the image sensor 124 where the second sampling interval precedes the first sampling interval by a period. For example, the period corresponds to a single sampling interval such that the second sampling interval is the immediately preceding sampling interval. In additional or alternative examples, the period corresponds to multiple sampling intervals.

In the illustrated example of FIG. 1, the computation mode control circuitry 116 utilizes the statistic images (e.g., low-resolution images) to determine if a scene change has occurred that justifies a change to a computation mode (e.g., a power level) of the compute device. For example, the computation mode control circuitry 116 analyzes temporal changes between statistic images and provides a metric of motion detected in the FOV of the image sensor 124 of the camera 102 to determine if adjusting a computation condition (e.g., waking up the compute device) is justified. As such, the computation mode control circuitry 116 enables the compute device to provide the "always on" effect when motion is detected in front of the camera 102.

In some examples, if the computation mode control circuitry 116 does not detect motion between the statistic images (e.g., low-resolution images), the computation mode control circuitry 116 causes the compute device to transition to a sleep mode of operation (e.g., a sleep operating mode). In the sleep mode of operation, the camera 102 collects raw images across a larger period than during a wake mode of operation (e.g., a wake operating mode). Additionally or alternatively, if the computation mode control circuitry 116 detects motion, the computation mode control circuitry 116 causes the compute device (e.g., the secondary image processing circuitry 118, the processor circuitry 120 and/or the accelerator circuitry 122) to capture full resolution images and run more complex analysis such as facial detection and/or facial authentication. If a face is authenticated, the host OS executing on the CPU wakes up the compute device and the host OS logs into the compute device.

In the illustrated example of FIG. 1, when the compute device is in the sleep mode of operation, the camera 102, the image capture PHY circuitry 104, the image generation circuitry 106, the preliminary image processing circuitry 110, and the computation mode control circuitry 116 are configured to operate, but the secondary image processing circuitry 118, the processor circuitry 120, and the accelerator circuitry 122 are configured not to operate. In the example of FIG. 1, when the compute device is in the wake mode of operation, the camera 102, the image capture PHY circuitry 104, the image generation circuitry 106, the preliminary image processing circuitry 110, the computation mode control circuitry 116, the secondary image processing circuitry 118, the processor circuitry 120, and the accelerator circuitry 122 are configured to operate.

In the illustrated example of FIG. 1, the secondary image processing circuitry 118 is coupled to the preliminary image processing circuitry 110, the intermediate processed image datastore 114, the processor circuitry 120, and the accelerator circuitry 122. In the example of FIG. 1, the secondary image processing circuitry 118 is implemented by one or more electronic circuits. In some examples, the secondary image processing circuitry 118 is implemented by processor circuitry executing instructions.

In the illustrated example of FIG. 1, the secondary image processing circuitry 118 executes one or more image processing algorithms to transform intermediate processed images to processed images. For example, the secondary image processing circuitry 118 executes one or more algorithms to remove the mosaic effect caused by a Bayer filter mosaic, one or more edge enhancement algorithms, one or more YUV domain processing algorithms, and/or one or more compression algorithms. Example algorithms to remove mosaic effect include color interpolation algorithms, color correction algorithms, gamma correction algorithms, and color space conversion algorithms, among others.

In the illustrated example of FIG. 1, the secondary image processing circuitry 118 communicates processed images to the processor circuitry 120 and/or the accelerator circuitry 122. In some examples, the secondary image processing circuitry 118 communicates processed images to a video encoder (e.g., video encoder circuitry), a display controller (e.g., display control circuitry), and/or other processor circuitry (e.g., that is in charge other general processing). In additional or alternative examples, the secondary image processing circuitry 118 causes storage of processed images in a datastore.

In the illustrated example of FIG. 1, the processor circuitry 120 is coupled to the computation mode control circuitry 116 and the secondary image processing circuitry 118. In some examples, the processor circuitry 120 is implemented as part of the SoC (e.g., IPU SoC) including the image capture PHY circuitry 104, the image generation circuitry 106, the preliminary image processing circuitry 110, the computation mode control circuitry 116, and the secondary image processing circuitry 118. In such examples, the processor circuitry 120 operates as a main processor of the SoC (e.g., IPU SoC) and control communication between the SoC and the CPU of the compute device. In other examples, the processor circuitry 120 is implemented in a different SoC than the SoC (e.g., IPU SoC) including the image capture PHY circuitry 104, the image generation circuitry 106, the preliminary image processing circuitry 110, the computation mode control circuitry 116, and the secondary image processing circuitry 118. In such examples, the processor circuitry 120 corresponds to the CPU of the compute device and executes the host OS of the compute device.

In the illustrated example of FIG. 1, the accelerator circuitry 122 is coupled to the computation mode control circuitry 116 and the secondary image processing circuitry 118. The accelerator circuitry 122 is implemented by any suitable accelerator circuitry such as a vision processor unit (VPU) or graphics processor unit (GPU), among others. In some examples, the accelerator circuitry 122 is implemented as part of the SoC (e.g., IPU SoC) including the image capture PHY circuitry 104, the image generation circuitry 106, the preliminary image processing circuitry 110, the computation mode control circuitry 116, and the secondary image processing circuitry 118. In other examples, the accelerator circuitry 122 is implemented in a different SoC than the SoC (e.g., IPU SoC) including the image capture PHY circuitry 104, the image generation circuitry 106, the preliminary image processing circuitry 110, the computation mode control circuitry 116, and the secondary image processing circuitry 118. In the example of FIG. 1, the accelerator circuitry 122 executes one or more AI algorithms on processed images. For example, the accelerator circuitry 122 executes one or more computer vision algorithms such as one or more facial detection algorithms or one or more facial authentication algorithms, among others.

In the illustrated example of FIG. 1, each of the input buffer 108, the statistic image datastore 112, and the intermediate processed image datastore 114 are illustrated as a single memory. In some examples, each of the input buffer 108, the statistic image datastore 112, and the intermediate processed image datastore 114 may be implemented by any number and/or type(s) of memories and/or storage. Furthermore, the data stored in the input buffer 108, the statistic image datastore 112, and the intermediate processed image datastore 114 may be in any data format such as, for example, binary data, comma delimited data, tab delimited data, structured query language (SQL) structures, etc.

Additionally, while in the example of FIG. 1, the input buffer 108, the statistic image datastore 112, and the intermediate processed image datastore 114 are illustrated as separate memories, in some examples, one memory and/or storage device, or one group of memories and/or storage devices, may implement the input buffer 108, the statistic image datastore 112, and the intermediate processed image datastore 114. Furthermore, any of the input buffer 108, the statistic image datastore 112, or the intermediate processed image datastore 114 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). Additionally or alternatively any of the input buffer 108, the statistic image datastore 112, or the intermediate processed image datastore 114 may be implemented by one or more double data rate (DDR) memories, such as DDR, DDR2, DDR3, DDR4, DDR5, mobile DDR (mDDR), low-power DDR (LPDDR) (e.g., LPDDR4, LPDDR4X, etc.), DDR SDRAM, etc. Any of the input buffer 108, the statistic image datastore 112, or the intermediate processed image datastore 114 may additionally or alternatively be implemented by one or more mass storage devices such as hard disk drive(s) (HDD(s)), compact disk (CD) drive(s), digital versatile disk (DVD) drive(s), solid-state disk (SSD) drive(s), Secure Digital (SD) card(s), CompactFlash (CF) card(s), etc.

Figure 2:
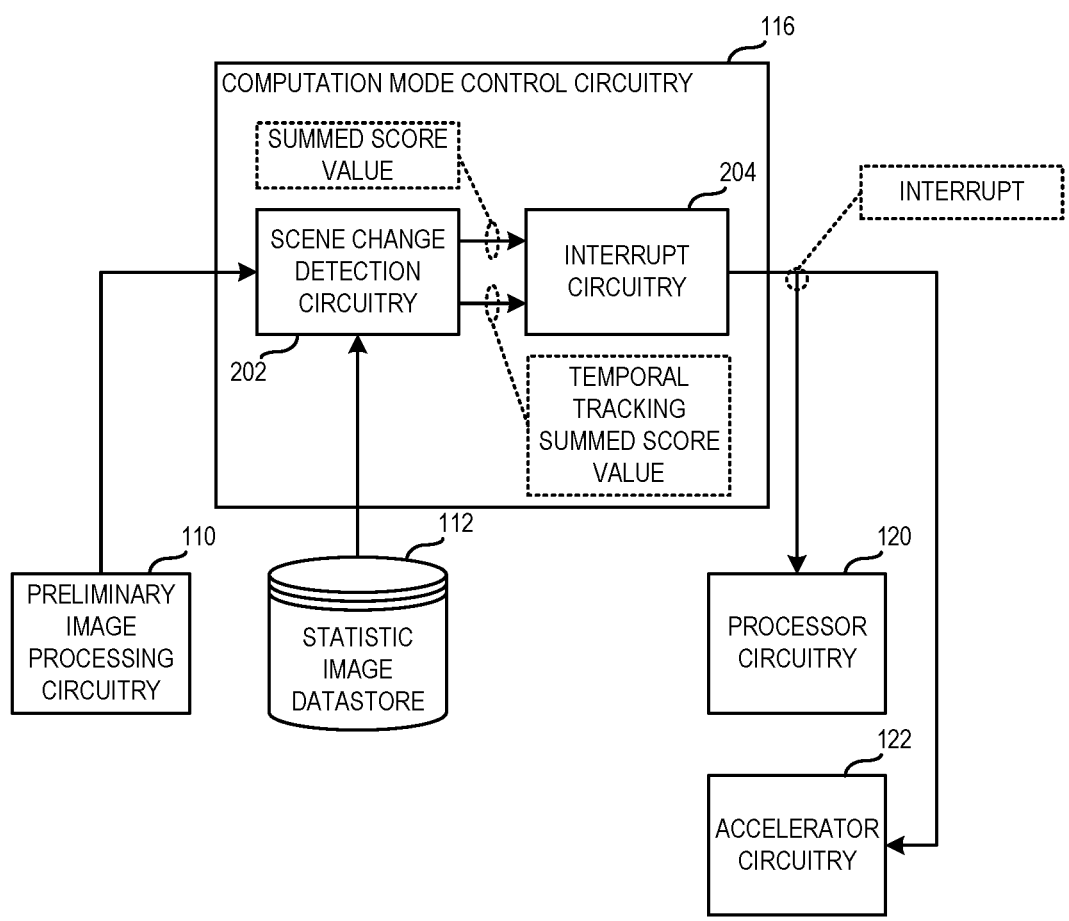
FIG. 2 is a block diagram of example computation mode control circuitry of the ISP pipeline of FIG. 1.

FIG. 2 is a block diagram of example computation mode control circuitry 116 of the ISP pipeline 100 of FIG. 1. The computation mode control circuitry 116 of FIG. 2 may be instantiated (e.g., creating an instance of, bring into being for any length of time, materialize, implement, etc.) by processor circuitry such as a CPU executing instructions. Additionally or alternatively, the computation mode control circuitry 116 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the illustrated example of FIG. 2, the computation mode control circuitry 116 includes example scene change detection circuitry 202 and example interrupt circuitry 204. In the illustrated example of FIG. 2, the scene change detection circuitry 202 is coupled to the preliminary image processing circuitry 110 and the statistic image datastore 112. In some examples, the scene change detection circuitry 202 is instantiated by processor circuitry executing scene change detection instructions and/or configured to perform operations such as those represented by the flowchart of FIG. 7.

In the illustrated example of FIG. 2, the scene change detection circuitry 202 accesses two statistic images (e.g., low-resolution images, approximately 80×60 pixel images) to detect whether a scene change has occurred. For example, the scene change detection circuitry 202 accesses one channel of the two statistic images (e.g., monochrome statistic images). In the example of FIG. 2, the scene change detection circuitry 202 accesses a first statistic image (e.g., a first image representative) of an FOV of the image sensor 124 of the camera 102 of FIG. 1 and a second statistic image (e.g., a second image representative) of the FOV of the image sensor 124. For example, the scene change detection circuitry 202 accesses the first statistic image from the preliminary image processing circuitry 110 in response to the preliminary image processing circuitry 110 generating the first statistic image. Additionally, for example, the scene change detection circuitry 202 accesses the second statistic image from the statistic image datastore 112. In examples disclosed herein the two statistic images correspond to different sampling intervals of the image sensor 124 of the camera 102 of FIG. 1. For example, the first statistic image corresponds to a low-resolution image generated for the current sampling interval and the second statistic image corresponds to a low-resolution image generated for a previous sampling interval. For example, the second sampling interval precedes the first sampling interval by a period.

In the illustrated example of FIG. 2, the scene change detection circuitry 202 determines respective score values for various metrics of similarity (e.g., similarity metrics, at least one metric indicative of similarity) between the two statistic images (e.g., low-resolution images). For example, the scene change detection circuitry 202 determines a first score value (e.g., a first score, first data representative of a first score or first score value, etc.) for a first metric of similarity between the first statistic image and the second statistic image and a second score value for a second metric of similarity between the first statistic image and the second statistic image. Example metrics of similarity include image-to-image sum of absolute differences (SAD) and structural similarity (SSIM), among others. For example, additional or alternative metrics of similarity may be used.

In the illustrated example of FIG. 2, to determine the image-to-image SAD between two statistic images, the scene change detection circuitry 202 calculates, for each pixel, the absolute difference between the pixel value (p) in the first (e.g., current) statistic image and the second (e.g., previous) statistic image and averages the differences. For example, the scene change detection circuitry 202 implements equation 1 to determine the image-to-image SAD where n and m correspond to the dimension of the statistic images.

$$SAD = \frac{\sum_{i=0}^{n} \sum_{j=0}^{m} |p_{1_{i,j}} - p_{2_{i,j}}|}{n * m} \quad \text{Equation 1}$$

In the illustrated example of FIG. 2, to determine the SSIM between two statistic images, the scene change detection circuitry 202 compares the luminance, contrast, and structure of the two statistic images. For example, the scene change detection circuitry 202 implements equation 2 to compare the luminance of two statistic images where $\mu_i$ is a measure of the mean intensity of a statistic image and $C_1$ is a constant that is included to allow equation 2 to operate for values of $\mu_1$ and $\mu_2$ that, when summed, are close to zero.

$$l(\mu_1, \mu_2) = \frac{2 * \mu_1 * \mu_2 + C_1}{\mu_1^2 + \mu_2^2 + C_1} \quad \text{Equation 2}$$

In the illustrated example of FIG. 2, the scene change detection circuitry 202 implements equation 3 to compare the contrast of two statistic images where $\sigma_i$ is the standard deviation from the mean intensity of a statistic image and $C_2$ is a constant that is included to allow equation 3 to operate for values of $\sigma_1$ and $\sigma_2$ that, when summed, are close to zero.

$$c(\sigma_1, \sigma_2) = \frac{2*\sigma_1*\sigma_2 + C_2}{\sigma_1^2 + \sigma_2^2 + C_2} \quad \text{Equation 3}$$

In the illustrated example of FIG. 2, the scene change detection circuitry 202 implements equation 4 to compare the structure of two statistic images where $\sigma_{1,2}$ is a correlation coefficient between the mean intensities (e.g., $\mu_1$ and $\mu_2$) of the statistic images and $C_3$ is a constant that is included to allow equation 4 to operate for values of corresponding pairs of independent variables (e.g., $\mu_1$ and $\mu_2$, and $\sigma_1$ and $\sigma_2$) that, when summed, are close to zero.

$$s(\mu_1, \mu_2, \sigma_1, \sigma_2) = \frac{\sigma_{1,2} + C_3}{\sigma_1 * \sigma_2 + C_3} \quad \text{Equation 4}$$

In the illustrated example of FIG. 2, the scene change detection circuitry 202 implements equation 5 to determine the SSIM between two statistic images where $\alpha$, $\beta$, and $\gamma$ are parameters used to adjust the relative importance of the luminance (e.g., equation 2), the contrast (e.g., equation 3), and the structure (e.g., equation 4) in the overall SSIM metric.

$$\text{SSIM}(\mu_1,\mu_2,\sigma_1,\sigma_2)=[l(\mu_1,\mu_2)]^\alpha * [c(\sigma_1,\sigma_2)]^\beta * [s(\mu_1,\mu_2,\sigma_1,\sigma_2)]^\gamma \quad \text{Equation 5}$$

In the illustrated example of FIG. 2, to determine score values, the scene change detection circuitry 202 scales the raw results for the metrics of similarity between the statistic images to a range of score values. In the example of FIG. 2, the scene change detection circuitry 202 executes a piecewise linear function to scale the raw results to the range of score values. The piecewise linear function utilized may be selected by a developer of the scene change detection circuitry 202.

In the illustrated example of FIG. 2, the scene change detection circuitry 202 scales the raw results for the metrics of similarity between the statistic images to a range between zero and one (e.g., $0 \leq \text{score\_value}_i \leq 1$). In the example of FIG. 2, score values closer to zero indicate that two statistic images are more similar while score values closer to one indicate that the two images are more different. In other examples, different ranges may be utilized and/or different techniques of assigning similarity may be used. For instance, in some examples, a high score value (e.g., 1) indicates similarity between statistic images while a low score value (e.g., 0) indicates differences between statistic images. In other examples, a score value closer to one of the bounds of a range indicates differences between statistic images while a score value closer to the center of the range indicates similarity between statistic images or vice versa.

In some examples, the scene change detection circuitry 202 applies (e.g., the scene change detection circuitry 202 is to apply) one or more weights to the score values for the metrics of similarity to generate weighted score values. For example, the scene change detection circuitry 202 applies a first weight to the first score value (e.g., corresponding to the image-to-image SAD) to generate a first weighted score value and applies a second weight to the second score value (e.g., corresponding to SSIM) to generate a second weighted score value. In examples disclosed herein, the scene change detection circuitry 202 applies one or more weights to the score values for the metrics of similarity based on an area in the FOV of the image sensor 124 of the camera 102 where the scene change detection circuitry 202 is to detect a scene change. For example, depending on weights applied, the scene change detection circuitry 202 may emphasize (e.g., stress, prioritize, specify, etc.) the center of the FOV of the image sensor 124 or the periphery of the FOV of the image sensor 124 as the area of the FOV in which to monitor for changes.

In the illustrated example of FIG. 2, after determining score values for the various metrics of similarity between two statistic images (e.g., low-resolution images), the scene change detection circuitry 202 computes a composite score value based on the score values for the various metrics of similarity between the two statistic images. In the example of FIG. 2, the scene change detection circuitry 202 sums the score values (e.g., weighted or unweighted) to compute a summed score value. In additional or alternative examples, the scene change detection circuitry 202 computes a composite score value in any other suitable manner. In the example of FIG. 2, the scene change detection circuitry 202 implements equation 6 to determine the composite score value (e.g., summed score value) where n corresponds to the number of metrics of similarity used to compare statistic images and $w_i$ corresponds to the weight applied to a corresponding score value, $\text{score\_value}_i$.

$$\text{Summed Score Value} = \sum_{i=0}^{n} w_i * \text{score\_value}_i \quad \text{Equation 6}$$

As described above, in the illustrated example of FIG. 2, the scene change detection circuitry 202 determines whether a scene change has occurred based on a statistic image (e.g., low-resolution image) for a current sampling interval and a statistic image (e.g., low-resolution image) for a previous sampling interval. In some examples, the scene change detection circuitry 202 determines an average score value based on the statistic image for a current sampling interval and statistic images for a threshold number of previous sampling intervals. For example, the scene change detection circuitry 202 maintains a running average of the score value for the statistic image for the current sampling interval and the score values (e.g., composite scores) for the statistic images for a threshold number of previous sampling intervals. In the example of FIG. 2, the scene change detection circuitry 202 determines the arithmetic mean of (1) a score value for the statistic image for a current sampling interval and (2) a stored score value representative of the arithmetic mean of the score values for statistic images for the threshold number (e.g., 15-30) of previous sampling intervals. As such, the scene change detection circuitry 202 can track trending changes in the scene over time. In this manner, even if the computation mode control circuitry 116 does not detect small changes in a scene (e.g., registering a score value less than the threshold value) over a short period of time (e.g., from one sampling interval to the next), the computation mode control circuitry 116 will detect changes that occur over a longer period of time. In examples disclosed herein, a user may provide calibration parameters to the scene change detection circuitry 202 to adjust the threshold number of sampling intervals to be included when computing the average score value. Average score values are referred to herein as temporal tracking score values.

In the illustrated example of FIG. 2, after generating a composite (e.g., summed) score value and/or a temporal tracking score value, the scene change detection circuitry 202 communicates the composite score value and/or the temporal tracking score value to the interrupt circuitry 204. In additional or alternative examples, the scene change detection circuitry 202 analyzes 3A statistics (e.g., AE histogram(s)) to detect whether a scene change has occurred. In the example of FIG. 2, the interrupt circuitry 204 is coupled to the scene change detection circuitry 202, the processor circuitry 120, and the accelerator circuitry 122. In some examples, the interrupt circuitry 204 is instantiated by processor circuitry executing interrupt instructions and/or configured to perform operations such as those represented by the flowchart of FIG. 7.

In the illustrated example of FIG. 2, the interrupt circuitry 204 compares the composite (e.g., summed) score value and/or the temporal tracking score value to one or more threshold values. For example, the interrupt circuitry 204 includes a first threshold value to which a composite score value and/or a temporal tracking score value is to be compared to determine whether to transition a compute device from a sleep mode of operation to a wake mode of operation. In additional or alterative examples, the interrupt circuitry 204 includes a second threshold value to which a composite score value and/or a temporal tracking score value is to be compared to determine whether to transition a compute device from a wake mode of operation to a sleep mode of operation. In some examples, the interrupt circuitry 204 includes a third threshold value to which a composite score value and/or a temporal tracking score value is to be compared to determine whether to adjust computation of a compute device while remaining in a wake mode of operation.

In the illustrated example of FIG. 2, the interrupt circuitry 204 determines whether the composite (e.g., summed) score value and/or the temporal tracking score value satisfies (e.g., is equal to, is greater than, is greater than or equal to, is less than, is less than or equal to, meets, etc.) a threshold value. In the example of FIG. 2, in response to determining that the composite score value and/or the temporal tracking score value satisfies a threshold value, the interrupt circuitry 204 detects a scene change. Additionally, the interrupt circuitry 204 generates an interrupt to processor circuitry of the compute device to cause the processor circuitry to adjust the computation condition associated with the satisfied threshold value.

In the illustrated example of FIG. 2, the interrupted processor circuitry varies depending on the threshold value satisfied by the composite (e.g., summed) score value and/or the temporal tracking score value. For example, to transition the compute device between the sleep mode of operation and the wake mode of operation (or vice versa), the interrupt circuitry 204 generates an interrupt to the processor circuitry 120. In additional or alternative examples, to adjust computation of the compute device while remaining in a wake mode of operation, the interrupt circuitry 204 generates an interrupt to the accelerator circuitry 122.

In some examples, to verify that a composite (e.g., summed) score value and/or a temporal tracking score value is accurate, the interrupt circuitry 204 also evaluates 3A statistics (e.g., AE histogram(s), estimation(s) of local pixel saturation, etc.) generated by the preliminary image processing circuitry 110. As described above, in some examples, the preliminary image processing circuitry 110 is implemented by hardware accelerator circuitry. In such examples, 3A statistics can be generated and used to verify the accuracy of composite score values and/or temporal tracking score values without relying on software executing on processor circuitry (e.g., the processor circuitry 120) to determine the 3A statistics. In this manner, information that is typically provided by software in the wake mode of operation is also available during the sleep mode of operation.

Additionally, utilizing statistic images and/or 3A statistics to detect and/or verify scene changes allows for compute devices to accurately detect scene changes while operating in a sleep mode. For example, in the sleep mode of operation, the camera 102 collects images at a reduced frame rate (e.g., 1 frame per second (FPS)) as compared to the wake mode of operation (e.g., 15-30 FPS). Operating the camera 102 at a reduced frame rate significantly lowers the amount of power consumed by the camera 102. Yet, even at the reduced frame rate, the computation mode control circuitry 116 is still capable of accurately detecting scene changes. As such, the computation mode control circuitry 116 improves performance of compute devices while also accurately detecting scene changes to trigger an interrupt that will wake up the compute devices. After receiving an interrupt, the interrupted processor circuitry adjusts the corresponding computation condition of the compute device.

As described above, the computation mode control circuitry 116 may be instantiated by processor circuitry such as a CPU executing instructions and/or by an ASIC or an FPGA structured to perform operations corresponding to instructions. A developer may vary the implementation of the computation mode control circuitry 116 based on the camera with which the computation mode control circuitry 116 is to operate. For example, if the camera is an integrated camera, a developer may instantiate the computation mode control circuitry 116 as an ASIC or an FPGA integrated with (e.g., on the same die as and within the same package as) an IPU SoC of the compute device. Additionally or alternatively, if the camera is a separate device connected to the compute device, a developer may instantiate the computation mode control circuitry 116 as an ASIC or an FPGA separate from (e.g., on a separate die and/or in a separate package from) the IPU SoC. In some examples, a developer may instantiate the computation mode control circuitry 116 as a CPU executing instructions (e.g., software) and/or a microcontroller executing instructions (e.g., firmware).

In some examples, the computation mode control circuitry 116 includes means for detecting a scene change. For example, the means for detecting a scene change may be implemented by the scene change detection circuitry 202. In some examples, the scene change detection circuitry 202 may be instantiated by processor circuitry such as the example processor circuitry 812 of FIG. 8. For instance, the scene change detection circuitry 202 may be instantiated by the example microprocessor 900 of FIG. 9 executing machine executable instructions such as those implemented by at least blocks 708, 710, 712, 714, 716, 718, and 720 of FIG. 7. In some examples, the scene change detection circuitry 202 may be instantiated by hardware logic circuitry, which may be implemented by an ASIC, XPU, or the FPGA circuitry 1000 of FIG. 10 structured to perform operations corresponding to the machine readable instructions. Additionally or alternatively, the scene change detection circuitry 202 may be instantiated by any other combination of hardware, software, and/or firmware. For example, the scene change detection circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computation mode control circuitry 116 includes means for interrupting. For example, the means for interrupting may be implemented by the interrupt circuitry 204. In some examples, the interrupt circuitry 204 may be instantiated by processor circuitry such as the example processor circuitry 812 of FIG. 8. For instance, the interrupt circuitry 204 may be instantiated by the example microprocessor 900 of FIG. 9 executing machine executable instructions such as those implemented by at least blocks 722, 724, and 726 of FIG. 7. In some examples, the interrupt circuitry 204 may be instantiated by hardware logic circuitry, which may be implemented by an ASIC, XPU, or the FPGA circuitry 1000 of FIG. 10 structured to perform operations corresponding to the machine readable instructions. Additionally or alternatively, the interrupt circuitry 204 may be instantiated by any other combination of hardware, software, and/or firmware. For example, the interrupt circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 3:
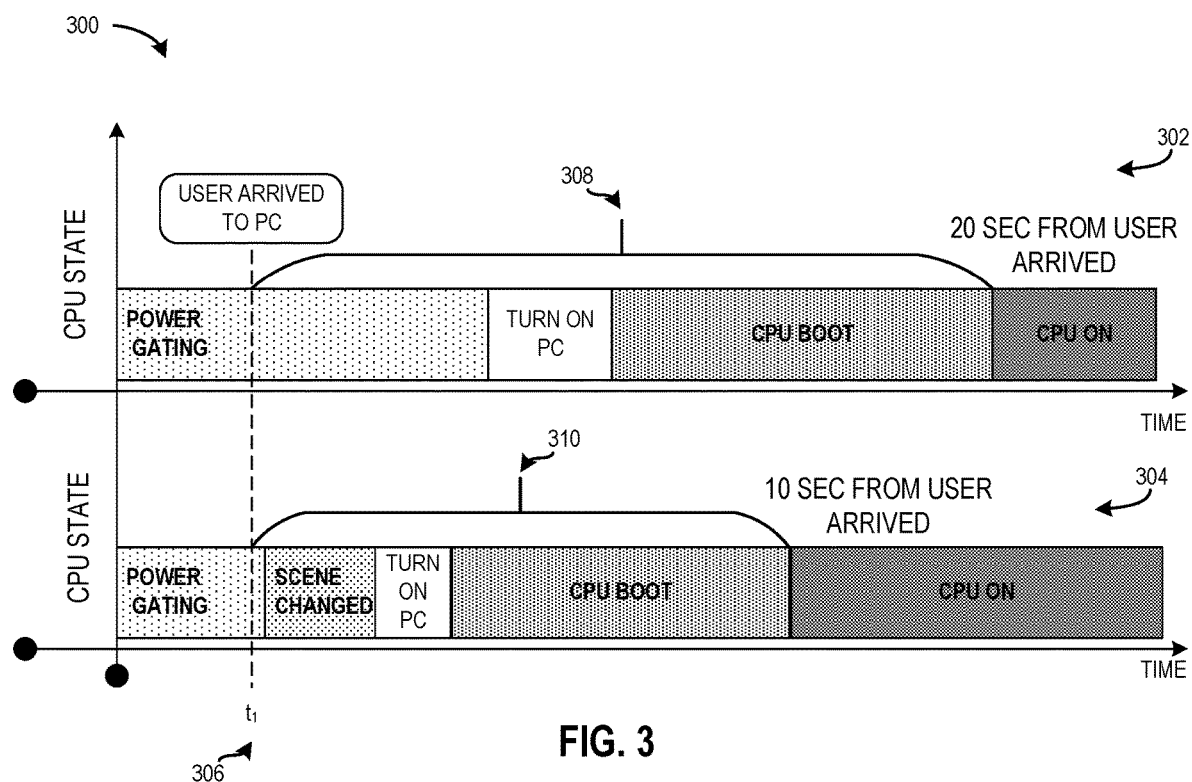
FIG. 3 is a timing diagram illustrating example computational improvements achieved by the example computation mode control circuitry of FIGS. 1 and 2 as compared to existing technology.

FIG. 3 is a timing diagram 300 illustrating example computational improvements achieved by the example computation mode control circuitry 116 of FIGS. 1 and 2 as compared to existing technology. The example timing diagram 300 includes an example first plot 302 and an example second plot 304. In the first plot 302 and the second plot 304, before an example first time 306 ($t_1$), a compute device implementing existing technology (the first plot 302) and a compute device implementing the example computation mode control circuitry 116 (the second plot 304) are in a sleep mode of operation (e.g., power gating). At the first time 306 ($t_1$), a user arrives at the compute device implementing existing technology (the first plot 302) and the compute device implementing the example computation mode control circuitry 116 (the second plot 304).

In the illustrated example of FIG. 3, after the first time 306 ($t_1$), the compute device implementing existing technology (the first plot 302) and the compute device implementing the example computation mode control circuitry 116 (the second plot 304) begin to transition between the sleep mode of operation and a wake mode of operation. Advantageously, the computation mode control circuitry 116 detects the presence of the user more quickly than existing technology. For example, the existing technology initiates the wake mode operation 20 seconds after the first time 306 ($t_1$) (e.g., the period 308 is 20 seconds) while the computation mode control circuitry 116 initiates the wake mode operation 10 seconds after the first time 306 ($t_1$) (e.g., the period 310 is 10 seconds). Accordingly, examples disclosed herein reduce the boot time of compute devices as compared to existing technology, for example, by 10 seconds in the example of FIG. 3.

Figure 4:
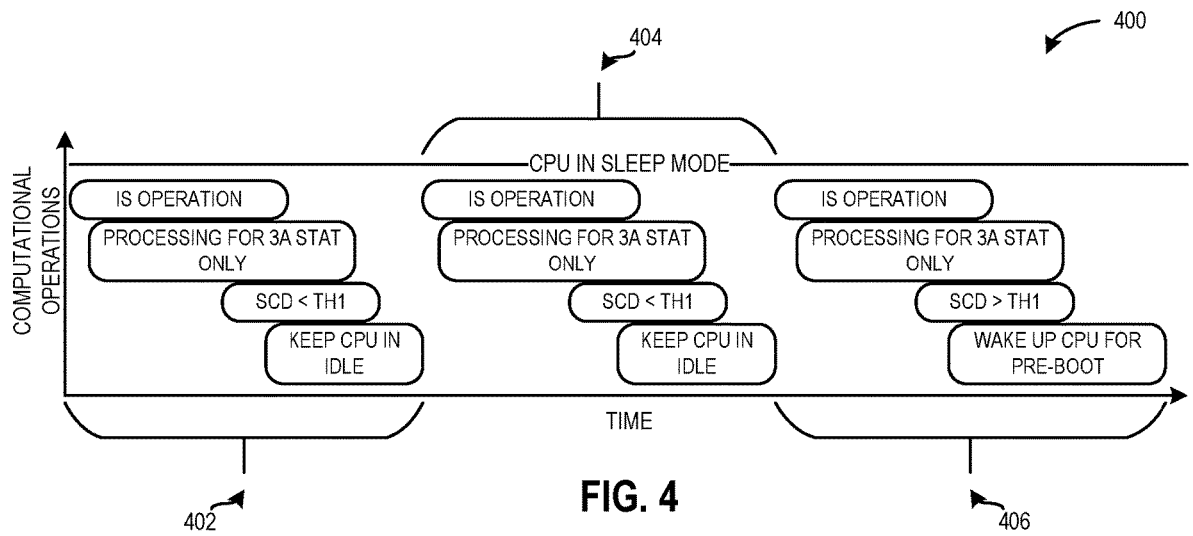
FIGS. 4, 5, and 6 are timing diagrams illustrating example operation of a compute device including the example computation mode control circuitry of FIGS. 1 and 2.

FIG. 4 is a timing diagram 400 illustrating example operation of a compute device including the example computation mode control circuitry 116 of FIGS. 1 and 2. The example timing diagram 400 is representative of the compute device when transitioning from a sleep mode of operation to a wake mode of operation. The timing diagram 400 includes an example first sampling interval 402 of the image sensor 124 of the camera 102, an example second sampling interval 404 of the image sensor 124 of the camera 102, and an example third sampling interval 406 of the image sensor 124 of the camera 102.

In the illustrated example of FIG. 4, during the first sampling interval 402, the compute device is in the sleep mode of operation. As such, during the first sampling interval 402, the preliminary image processing circuitry 110 generates a statistic image but does not generate a processed image. Additionally, during the first sampling interval 402, the computation mode control circuitry 116 compares a composite (e.g., summed) score value for the current statistic image and a statistic image from a previous sampling interval to the first threshold value. In response to determining that the composite score value does not satisfy (e.g., is less than) the first threshold value, the computation mode control circuitry 116 does not generate an interrupt to the processor circuitry 120.

In the illustrated example of FIG. 4, during the second sampling interval 404, the compute device remains in the sleep mode of operation. As such, during the second sampling interval 404, the preliminary image processing circuitry 110 generates a statistic image but does not generate a processed image. Additionally, during the second sampling interval 404, the computation mode control circuitry 116 compares a composite (e.g., summed) score value for the current statistic image and the statistic image from the first sampling interval 402 to the first threshold value. In response to determining that the composite score value does not satisfy (e.g., is less than) the first threshold value, the computation mode control circuitry 116 does not generate an interrupt to the processor circuitry 120.

In the illustrated example of FIG. 4, during the third sampling interval 406, the compute device remains in the sleep mode of operation. As such, during the third sampling interval 406, the preliminary image processing circuitry 110 generates a statistic image but does not generate a processed image. Additionally, during the third sampling interval 406, the computation mode control circuitry 116 compares a composite (e.g., summed) score value for the current statistic image and the statistic image from the second sampling interval 404 to the first threshold value. In response to determining that the composite score value satisfies (e.g., is greater than) the first threshold value, the computation mode control circuitry 116 generates an interrupt to the processor circuitry 120 to cause the processor circuitry 120 to adjust a computation condition of the compute device. In the example of FIG. 4, the interrupt causes the processor circuitry 120 to transition the compute device from the sleep mode of operation to the wake mode of operation.

In some examples, after the compute device transitions to the wake mode of operation (e.g., including full operation of the IPU SoC and/or AI accelerator circuitry such as the accelerator circuitry 122), the accelerator circuitry 122 analyzes a processed image. For example, the accelerator circuitry 122 executes a facial detection algorithm and/or a facial authentication algorithm on the processed image. In response to the accelerator circuitry 122 detecting an authorized person (e.g., the detected face matches the face of an authorized person), the processor circuitry 120 maintains the compute device in the wake mode of operation and logs into the compute device. Alternatively, in response to the accelerator circuitry 122 detecting an unauthorized person (e.g., the detected face does not match the face of an authorized person), the processor circuitry 120 returns the compute device to the sleep mode of operation and the computation mode control circuitry 116 continues to monitor for the next scene change (e.g., detected motion).

Figure 5:
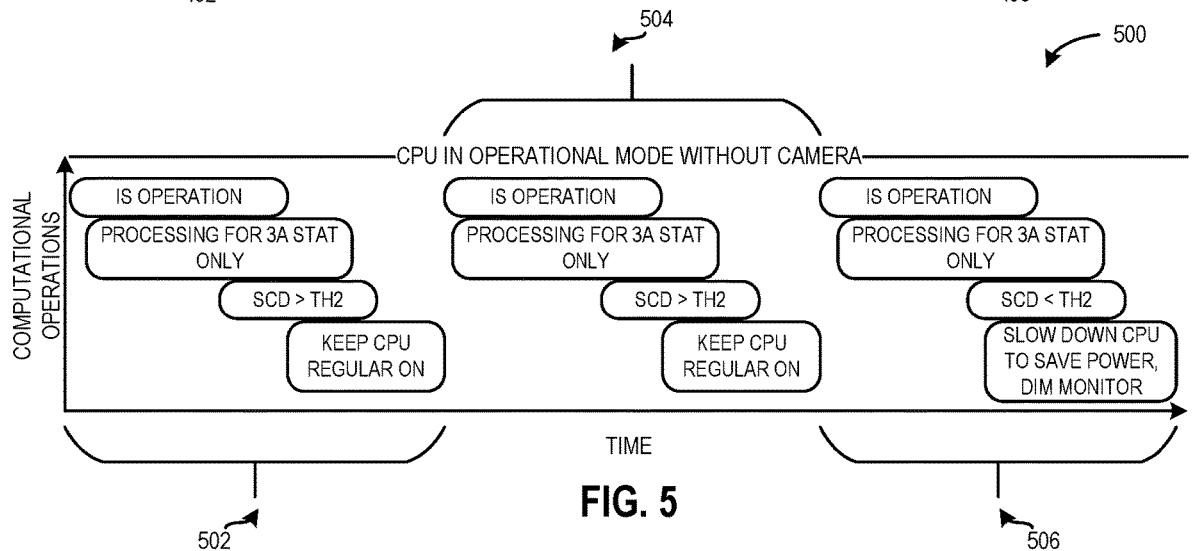

FIG. 5 is timing diagram 500 illustrating example operation of a compute device including the example computation mode control circuitry 116 of FIGS. 1 and 2. The example timing diagram 500 is representative of the compute device when transitioning from a wake mode of operation to a sleep mode of operation. The timing diagram 500 includes an example first sampling interval 502 of the image sensor 124 of the camera 102, an example second sampling interval 504 of the image sensor 124 of the camera 102, and an example third sampling interval 506 of the image sensor 124 of the camera 102.

In the illustrated example of FIG. 5, during the first sampling interval 502, the compute device is in the wake mode of operation but more complicated processing (e.g., computer vision) has not been triggered. As such, during the first sampling interval 502, the preliminary image processing circuitry 110 generates a statistic image. Additionally, during the first sampling interval 502, the computation mode control circuitry 116 compares a composite (e.g., summed) score value for the current statistic image and a statistic image from a previous sampling interval to the second threshold value. In response to determining that the composite score value does not satisfy (e.g., is greater than) the second threshold value, the computation mode control circuitry 116 does not generate an interrupt to the processor circuitry 120.

In the illustrated example of FIG. 5, during the second sampling interval 504, the compute device remains in the wake mode of operation without more complicated processing (e.g., computer vision). As such, during the second sampling interval 504, the preliminary image processing circuitry 110 generates a statistic image. Additionally, during the second sampling interval 504, the computation mode control circuitry 116 compares a composite (e.g., summed) score value for the current statistic image and the statistic image from the first sampling interval 502 to the second threshold value. In response to determining that the composite score value does not satisfy (e.g., is greater than) the second threshold value, the computation mode control circuitry 116 does not generate an interrupt to the processor circuitry 120.

In the illustrated example of FIG. 5, during the third sampling interval 506, the compute device remains in the wake mode of operation without more complicated processing (e.g., computer vision). As such, during the third sampling interval 506, the preliminary image processing circuitry 110 generates a statistic image. Additionally, during the third sampling interval 506, the computation mode control circuitry 116 compares a composite (e.g., summed) score value for the current statistic image and the statistic image from the second sampling interval 504 to the second threshold value. In response to determining that the composite score value satisfies (e.g., is less than) the second threshold value, the computation mode control circuitry 116 generates an interrupt to the processor circuitry 120 to cause the processor circuitry 120 to adjust a computation condition of the compute device. In the example of FIG. 5, the interrupt causes the processor circuitry 120 to transition the compute device from the wake mode of operation to the sleep mode of operation (e.g., to slow down the processor circuitry 120 to save power, to dim a monitor of the compute device, etc.). In some examples, the interrupt causes the processor circuitry 120 to transition the compute device from the wake mode of operation to an intermediate mode of operation (e.g., an intermediate operating mode) where the processor circuitry 120 and peripheral devices to the compute device enter a lower performance mode while still being considered "on."

Figure 6:
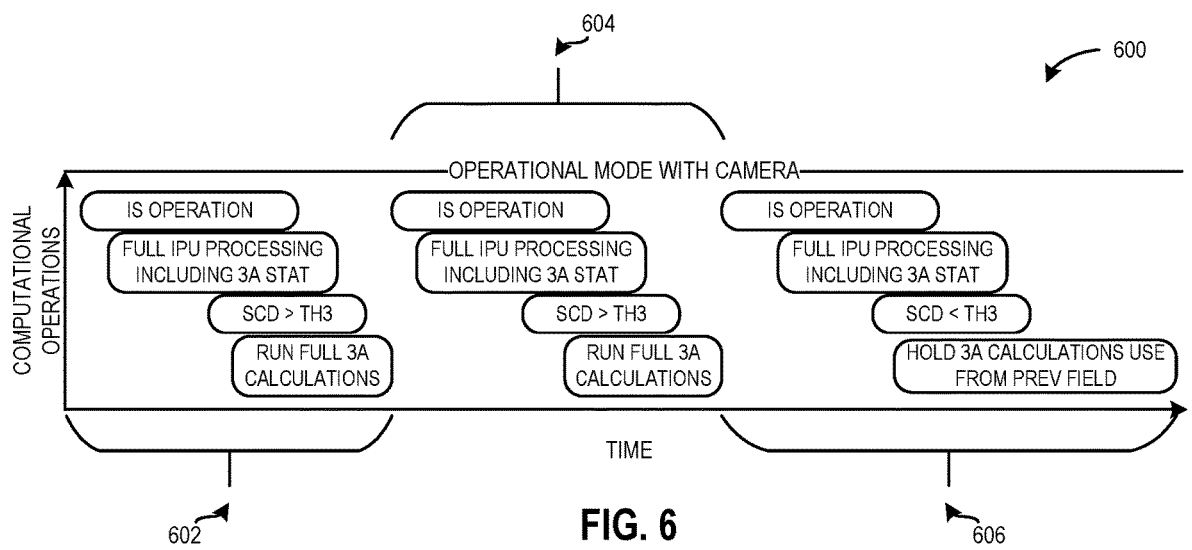

FIG. 6 is timing diagram 600 illustrating example operation of a compute device including the example computation mode control circuitry 116 of FIGS. 1 and 2. The example timing diagram 600 is representative of the compute device when transitioning from a wake mode of operation with more complicated processing (e.g., computer vision) to the wake mode of operation without the more complicated processing. The timing diagram 600 includes an example first sampling interval 602 of the image sensor 124 of the camera 102, an example second sampling interval 604 of the image sensor 124 of the camera 102, and an example third sampling interval 606 of the image sensor 124 of the camera 102.

In the illustrated example of FIG. 6, during the first sampling interval 602, the compute device is in the wake mode of operation and more complicated processing (e.g., computer vision) has been triggered. As such, during the first sampling interval 602, the preliminary image processing circuitry 110 generates a statistic image, the secondary image processing circuitry 118 generates a processed image, and the accelerator circuitry 122 executes one or more computer vision algorithms. Additionally, during the first sampling interval 602, the computation mode control circuitry 116 compares a composite (e.g., summed) score value for the current statistic image and a statistic image from a previous sampling interval to the third threshold value. In response to determining that the composite score value does not satisfy (e.g., is greater than) the third threshold value, the computation mode control circuitry 116 does not generate an interrupt to the processor circuitry 120 and/or the accelerator circuitry 122.

In the illustrated example of FIG. 6, during the second sampling interval 604, the compute device remains in the wake mode of operation with more complicated processing (e.g., computer vision). As such, during the second sampling interval 604, the preliminary image processing circuitry 110 generates a statistic image, the secondary image processing circuitry 118 generates a processed image, and the accelerator circuitry 122 executes one or more computer vision algorithms. Additionally, during the second sampling interval 604, the computation mode control circuitry 116 compares a composite (e.g., summed) score value for the current statistic image and the statistic image from the first sampling interval 602 to the third threshold value. In response to determining that the composite score value does not satisfy (e.g., is greater than) the third threshold value, the computation mode control circuitry 116 does not generate an interrupt to the processor circuitry 120 and/or the accelerator circuitry 122.

In the illustrated example of FIG. 6, during the third sampling interval 606, the compute device remains in the wake mode of operation with more complicated processing (e.g., computer vision). As such, during the third sampling interval 606, the preliminary image processing circuitry 110 generates a statistic image, the secondary image processing circuitry 118 generates a processed image, and the accelerator circuitry 122 executes one or more computer vision algorithms. Additionally, during the third sampling interval 606, the computation mode control circuitry 116 compares a composite (e.g., summed) score value for the current statistic image and the statistic image from the second sampling interval 604 to the third threshold value. In response to determining that the composite score value satisfies (e.g., is less than) the third threshold value, the computation mode control circuitry 116 generates an interrupt to the processor circuitry 120 and/or the accelerator circuitry 122 to cause the processor circuitry 120 and/or the accelerator circuitry 122 to adjust a computation condition of the compute device.

In the illustrated example of FIG. 6, the interrupt causes the processor circuitry 120 and/or the accelerator circuitry 122 to disable more complicated processing (e.g., computer vision) while the composite score value satisfies (e.g., is less than) the third threshold value. If the computation mode control circuitry 116 determines that the composite score value no longer satisfies (e.g., is greater than) the third threshold value, the computation mode control circuitry 116 transmits an interrupt to the processor circuitry 120 and/or the accelerator circuitry 122. Such an interrupt causes the processor circuitry 120 and/or the accelerator circuitry 122 to resume more complicated processing (e.g., computer vision).

While the examples of FIGS. 4, 5, and 6 illustrate that the computation mode control circuitry 116 generates an interrupt to processor circuitry after detecting a scene change between statistic images captured for a first sampling interval a previous sampling interval, other examples are possible. For instance, in some examples, in response to detecting a scene change between a statistic image for a first sampling interval and a reference statistic image for a previous sampling interval, the computation mode control circuitry 116 (e.g., the interrupt circuitry 204) maintains a count of how many statistic images for subsequent sampling intervals register as a scene change with respect to the reference statistic image. If the computation mode control circuitry 116 counts a sufficient number of statistic images that register as a scene change with respect to the reference statistic image (e.g., the count satisfies a threshold count), the computation mode control circuitry 116 generates an interrupt to processor circuitry.

While an example manner of implementing the ISP pipeline 100 of FIG. 1 is illustrated in FIG. 1 and an example manner of implementing the example computation mode control circuitry 116 of FIG. 1 is illustrated in FIG. 2, one or more of the elements, processes, and/or devices illustrated in FIGS. 1 and/or 2 may be combined, divided, re-arranged, omitted, eliminated, and/or implemented in any other way. Further, the example image capture PHY circuitry 104, the example image generation circuitry 106, the example input buffer 108, the example preliminary image processing circuitry 110, the example statistic image datastore 112, the example intermediate processed image datastore 114, the example secondary image processing circuitry 118, the example processor circuitry 120, the example accelerator circuitry 122, the example scene change detection circuitry 202, the example interrupt circuitry 204, and/or, more generally, the example computation mode control circuitry 116 of FIGS. 1 and/or 2, may be implemented by hardware alone or by hardware in combination with software and/or firmware. Thus, for example, any of the example image capture PHY circuitry 104, the example image generation circuitry 106, the example input buffer 108, the example preliminary image processing circuitry 110, the example statistic image datastore 112, the example intermediate processed image datastore 114, the example secondary image processing circuitry 118, the example processor circuitry 120, the example accelerator circuitry 122, the example scene change detection circuitry 202, the example interrupt circuitry 204, and/or, more generally, the example computation mode control circuitry 116 of FIGS. 1 and/or 2, could be implemented by processor circuitry, analog circuit(s), digital circuit(s), logic circuit(s), programmable processor(s), programmable microcontroller(s), graphics processor unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example ISP pipeline 100 of FIG. 1 and/or the example computation mode control circuitry 116 of FIG. 1 may include one or more elements, processes, and/or devices in addition to, or instead of, those illustrated in FIGS. 1 and/or 2, and/or may include more than one of any or all of the illustrated elements, processes and devices.

Figure 7:
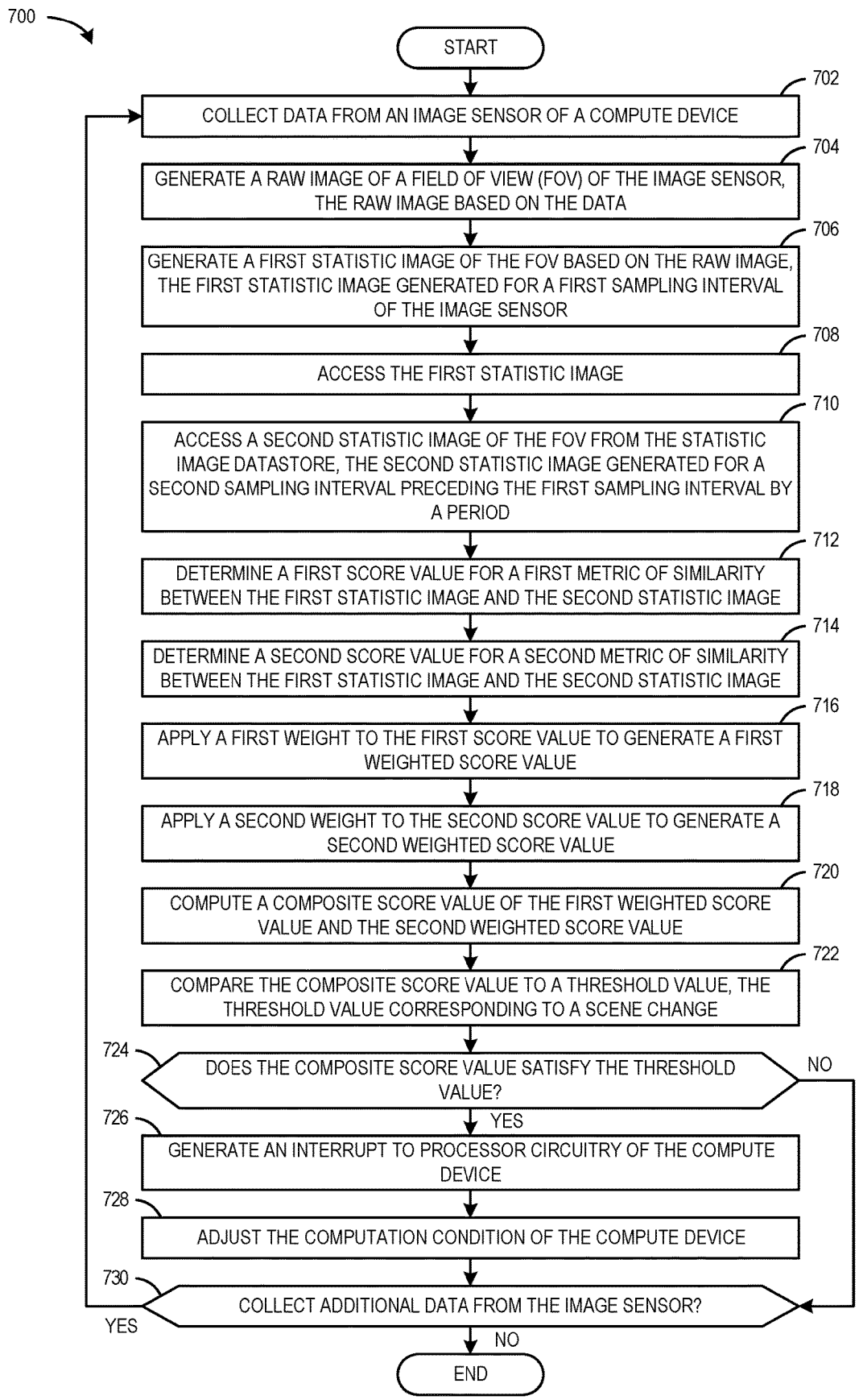
FIG. 7 is a flowchart representative of example machine readable instructions and/or example operations that may be executed and/or instantiated by example processor circuitry to implement the example ISP pipeline of FIG. 1 and/or the example computation mode control circuitry of FIGS. 1 and 2.

A flowchart representative of example machine readable instructions, which may be executed to configure processor circuitry to implement the example image capture PHY circuitry 104, the example image generation circuitry 106, the example input buffer 108, the example preliminary image processing circuitry 110, the example statistic image datastore 112, the example intermediate processed image datastore 114, the example secondary image processing circuitry 118, the example processor circuitry 120, the example accelerator circuitry 122, the example scene change detection circuitry 202, the example interrupt circuitry 204, and/or, more generally, the example computation mode control circuitry 116 of FIGS. 1 and/or 2, is shown in FIG. 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example ISP pipeline 100 and/or the example computation mode control circuitry 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by example processor circuitry to implement the example ISP pipeline 100 of FIG. 1 and/or the example computation mode control circuitry 116 of FIGS. 1 and 2. For example, processor circuitry, such as the processor circuitry 812 of FIG. 8, executes the example machine readable instructions and/or the example operations 700 to perform operations represented by the flowchart of FIG. 7 (e.g., the instructions cause processor circuitry to perform the operations).

In the illustrated example of FIG. 7, the machine readable instructions and/or the operations 700 of FIG. 7 begin at block 702, at which the image capture PHY circuitry 104 collects data from an image sensor of a compute device. For example, the image capture PHY circuitry 104 collects raw image data from the image sensor 124 of the camera 102 of the compute device of FIG. 1. At block 704, the image generation circuitry 106 generates a raw image of an FOV of the image sensor 124 where the raw image is based on the data collected from the image sensor 124. In the example of FIG. 7, at block 706, the preliminary image processing circuitry 110 generates a first statistic image (e.g., a first low-resolution image) of the FOV of the image sensor 124 based on the raw image. At block 706, the preliminary image processing circuitry 110 generates the first statistic image for a first sampling interval of the image sensor 124.

In the illustrated example of FIG. 7, at block 708, the scene change detection circuitry 202 accesses the first statistic image. For example, at block 708, the scene change detection circuitry 202 accesses the first statistic image from the preliminary image processing circuitry 110. In some examples, the scene change detection circuitry 202 accesses the first statistic image from the statistic image datastore 112. In the example of FIG. 7, at block 710, the scene change detection circuitry 202 accesses a second statistic image (e.g., a second low-resolution image) of the FOV of the image sensor 124 from the statistic image datastore 112. In the example of FIG. 7, the second statistic image was generated for a second sampling interval that precedes the first sampling interval by a period. For example, the period corresponds to a single sampling interval. In some examples, the period corresponds to multiple sampling intervals.

In the illustrated example of FIG. 7, at block 712, the scene change detection circuitry 202 determines a first score value for a first metric of similarity between the first statistic image and the second statistic image. For example, the first metric of similarity corresponds to image-to-image SAD. As described above, the first statistic image and the second statistic image are images having respective resolutions that are low relative to the resolution of the image sensor 124. At block 714, the scene change detection circuitry 202 determines a second score value for a second metric of similarity between the first statistic image and the second statistic image. For example, the second metric of similarity corresponds to SSIM.

In the illustrated example of FIG. 7, at block 716, the scene change detection circuitry 202 applies a first weight to the first score value to generate a first weighted score value. At block 718, the scene change detection circuitry 202 applies a second weight to the second score value to generate a second weighted score value. In the example of FIG. 7, the scene change detection circuitry 202 applies weights to score values for the metrics of similarity based on an area in the FOV of the image sensor 124 where the scene change detection circuitry 202 is to detect a scene change. At block 720, the scene change detection circuitry 202 computes a composite score value of the first weighted score value and the second weighted score value. For example, at block 720, the scene change detection circuitry 202 computes the composite score value as a summed score value according to equation 6. In some examples, the scene change detection circuitry 202 computes the composite score as a temporal tracking score value representative of the arithmetic mean of the summed score values for the statistic image (e.g., low-resolution image) for the current sampling interval and the statistic images (e.g., low-resolution images) for the threshold number of previous sampling intervals.

In the illustrated example of FIG. 7, at block 722, the interrupt circuitry 204 compares the composite score value (e.g., summed score value, temporal tracking score value, etc.) to a threshold value where the threshold value corresponds to a scene change. In some examples, the threshold value is a first threshold value corresponding to a transition of a compute device from a sleep mode of operation to a wake mode of operation. In additional or alternative examples, the threshold value is a second threshold value corresponding to a transition of a compute device from a wake mode of operation to a sleep mode of operation. In still other examples the threshold value is a third threshold value corresponding to an adjustment to computation of a compute device while remaining in a wake mode of operation.

In the illustrated example of FIG. 7, at block 724, the interrupt circuitry 204 determines whether the composite score value satisfies the threshold value. In response to the interrupt circuitry 204 determining that the composite score value does not satisfy the threshold value (block 724: NO), the machine readable instructions and/or the operations 700 proceed to block 730. In response to the interrupt circuitry 204 determining that the composite score value satisfies the threshold value (block 724: YES), the machine readable instructions and/or the operations 700 proceed to block 726.

In the illustrated example of FIG. 7, at block 726, the interrupt circuitry 204 generates an interrupt to processor circuitry of the compute device. In examples disclosed herein, based on the threshold value satisfied by the composite score value and/or the current mode of operation of the compute device, the interrupt circuitry 204 generates an interrupt to different processor circuitry. For example, if the compute device is currently in the sleep mode of operation and the composite score value satisfies the first threshold value, the interrupt circuitry 204 generates an interrupt to the processor circuitry 120 to cause the processor circuitry 120 to transition the compute device to the wake mode of operation.

In the illustrated example of FIG. 7, if the compute device is currently in the wake mode of operation and the composite score value satisfies the second threshold value, the interrupt circuitry 204 generates an interrupt to the processor circuitry 120 to cause the processor circuitry 120 to transition the compute device to the sleep mode of operation. Additionally or alternatively, if the compute device is currently in the wake mode of operation with complex image processing (e.g., computer vision) enabled and the composite score value satisfies the third threshold value, the interrupt circuitry 204 generates an interrupt to the processor circuitry 120 and/or the accelerator circuitry 122 to cause the processor circuitry 120 and/or the accelerator circuitry 122 to disable complex image processing (e.g., compute vision). In some examples, if the compute device is currently in the wake mode of operation with complex image processing (e.g., computer vision) disabled and the composite score value does not satisfy the third threshold value, the interrupt circuitry 204 generates an interrupt to the processor circuitry 120 and/or the accelerator circuitry 122 to cause the processor circuitry 120 and/or the accelerator circuitry 122 to enable complex image processing (e.g., computer vision).

In the illustrated example of FIG. 7, at block 728, the interrupted processor circuitry adjusts the corresponding computation condition of the compute device. For example, the processor circuitry 120 transitions the mode of operation (e.g., operating mode) of the compute device from a sleep mode of operation to a wake mode of operation or vice versa. Additionally or alternatively, the processor circuitry 120 and/or the accelerator circuitry 122 adjusts a complexity of image processing to be performed by the processor circuitry 120 and/or the accelerator circuitry 122 (e.g., a complexity of image processing to be performed by processor circuitry). For example, the processor circuitry 120 and/or the accelerator circuitry 122 enable or disable computer vision.

In the illustrated example of FIG. 7, at block 730, the image capture PHY circuitry 104 determines whether to collect additional data from the image sensor 124. In response to the image capture PHY circuitry 104 determining to collect additional data from the image sensor 124 (block 730: YES), the machine readable instructions and/or the operations 700 return to block 702. In response to the image capture PHY circuitry 104 determining not to collect additional data from the image sensor 124 (block 730: NO), the machine readable instructions and/or the operations 700 terminate. For example, the image capture PHY circuitry 104 determines not to collect additional data from the image sensor 124 in response to a loss of power to the compute device. For example, a user may turn off the compute device or the compute device may fall below a threshold power level where normal operation is suspended.

Figure 8:
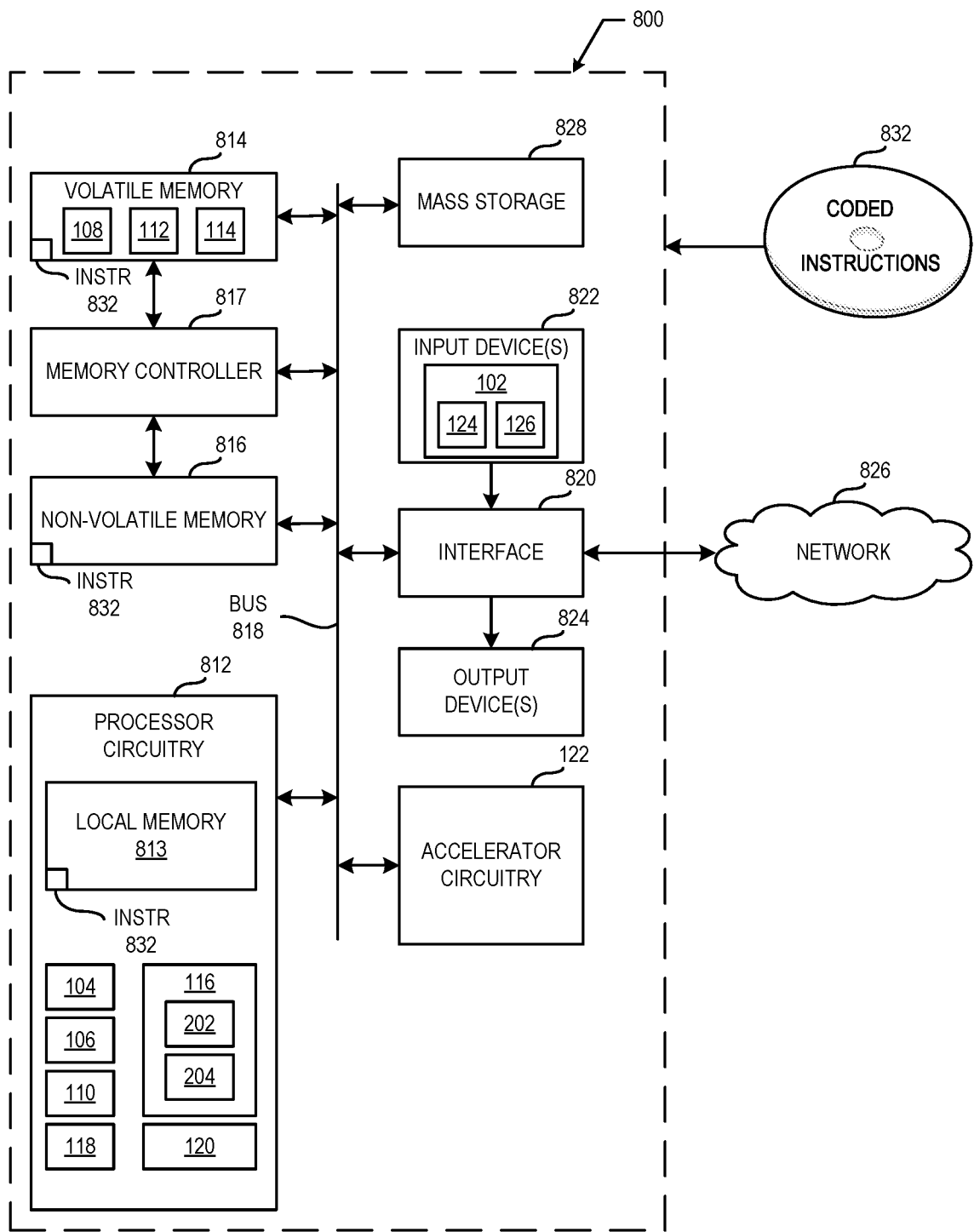
FIG. 8 is a block diagram of an example processor platform structured to execute and/or instantiate the machine readable instructions and/or the operations of FIG. 7 to implement the ISP pipeline of FIG. 1 and/or the computation mode control circuitry of FIGS. 1 and/or 2.

FIG. 8 is a block diagram of an example processor platform 800 structured to execute and/or instantiate the machine readable instructions and/or the operations 700 of FIG. 7 to implement the ISP pipeline 100 of FIG. 1 and/or the computation mode control circuitry 116 of FIGS. 1 and/or 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers (e.g., microcontroller units (MCUs)) from any desired family or manufacturer. For example, the processor circuitry 812 may be implemented by one or more Neural Processing Units (NPUs) such as an IPU and/or VPU disposed proximately to one or more CPUs, GPUs, and/or DSPs. In such examples, the one or more NPUs may execute and/or instantiate instructions (e.g., neural network instructions, machine learning instructions, AI instructions, etc.). The processor circuitry 812 may be implemented by one or more semiconductor based (e.g., silicon based) devices. In this example, the processor circuitry 812 implements the example image capture PHY circuitry 104, the example image generation circuitry 106, the example preliminary image processing circuitry 110, the example secondary image processing circuitry 118, the example processor circuitry 120, the example scene change detection circuitry 202, the example interrupt circuitry 204, and/or, more generally, the example computation mode control circuitry 116 of FIGS. 1 and/or 2.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. In the illustrated example of FIG. 8, the volatile memory 814 implements the example input buffer 108, the example statistic image datastore 112, and the example intermediate processed image datastore 114. The non-volatile memory 816 may be implemented by flash memory and/or any other desired type of memory device. Access to the main memory 814, 816 of the illustrated example is controlled by a memory controller 817.

The processor platform 800 of the illustrated example also includes accelerator circuitry such as the accelerator circuitry 122 of FIG. 1. In the example of FIG. 8, the accelerator circuitry 122 may be implemented by a VPU, a GPU, and/or any suitable accelerator circuitry. Additionally, the processor platform 800 of the illustrated example includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video, such as the example image sensor 124, the example camera PHY circuitry 126, and/or, more generally, the example camera 102 of FIG. 1), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 832, which may be implemented by the example machine readable instructions and/or the example operations 700 of FIG. 7, may be stored in the mass storage device 828, in the volatile memory 814, in the non-volatile memory 816, and/or on a removable non-transitory computer readable storage medium such as a CD or DVD.

Figure 9:
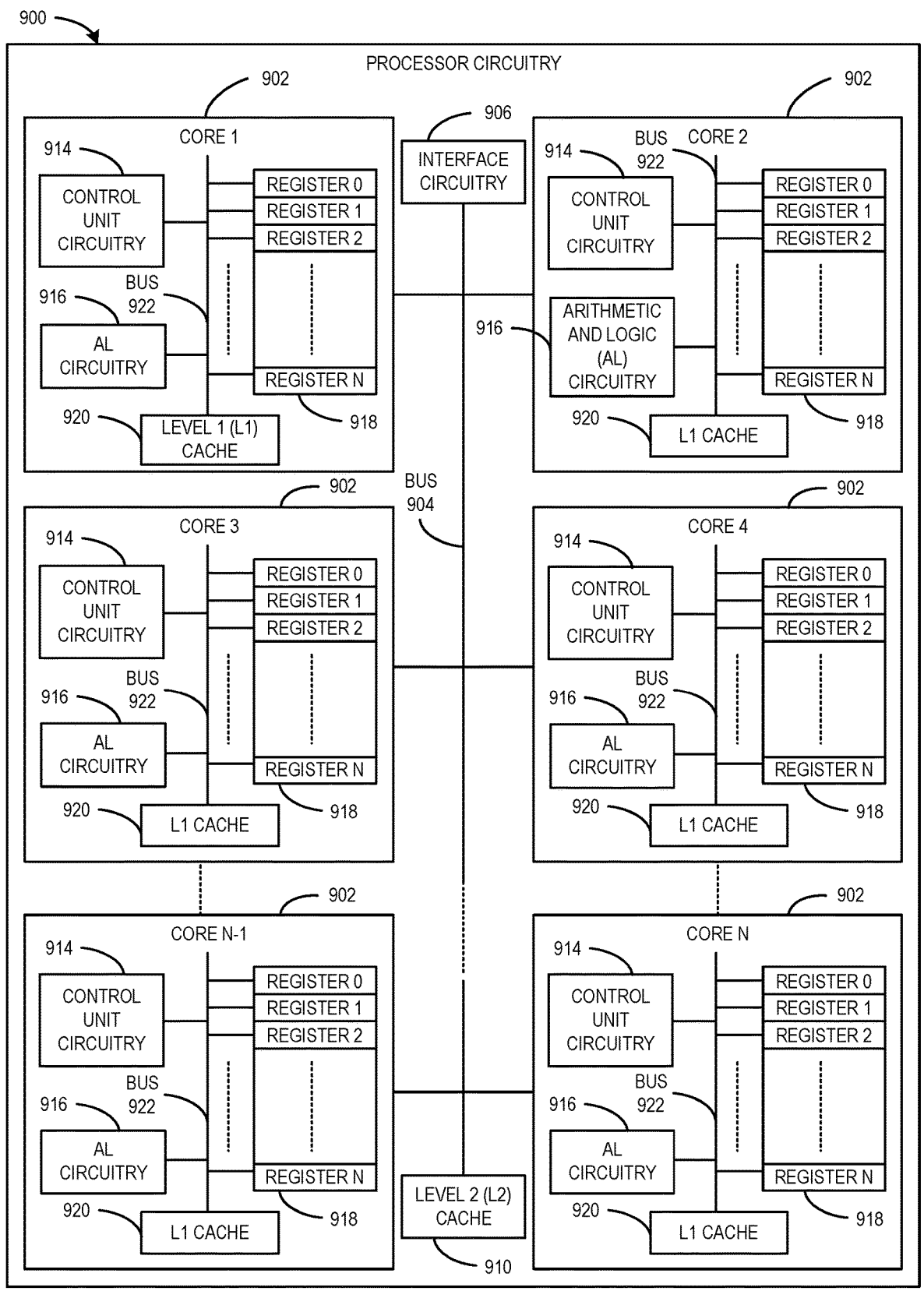
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may be a general purpose microprocessor (e.g., general purpose microprocessor circuitry). The microprocessor 900 executes some or all of the machine readable instructions of the flowchart of FIG. 7 to effectively instantiate the circuitry of FIGS. 1 and/or 2 as logic circuits to perform the operations corresponding to those machine readable instructions. In some such examples, the circuitry of FIGS. 1 and/or 2 is instantiated by the hardware circuits of the microprocessor 900 in combination with the instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowchart of FIG. 7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry 916 (sometimes referred to as arithmetic and logic circuitry 916, an ALU 916, etc.), a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control data movement (e.g., coordinate data movement) within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may be implemented by at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include integrated circuits such as ASICs and/or FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
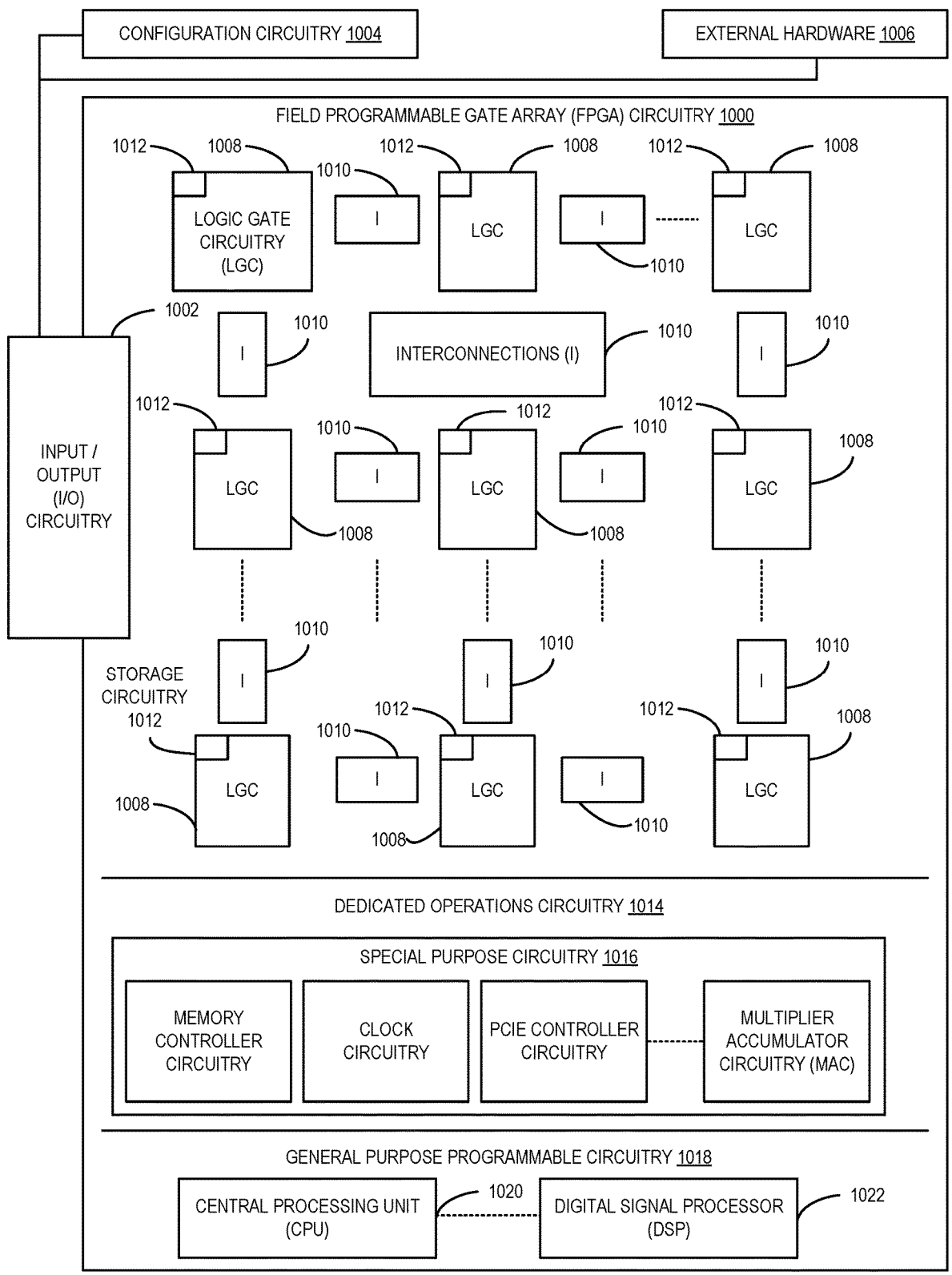
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowchart of FIG. 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowchart of FIG. 7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowchart of FIG. 7. As such, the FPGA circuitry 1000 may be structured to effectively instantiate some or all of the machine readable instructions of the flowchart of FIG. 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIG. 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may be implemented by external hardware circuitry. For example, the external hardware 1006 may be implemented by the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations that may correspond to at least some of the machine readable instructions of FIG. 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowchart of FIG. 7 may be executed by one or more of the cores 902 of FIG. 9, a second portion of the machine readable instructions represented by the flowchart of FIG. 7 may be executed by the FPGA circuitry 1000 of FIG. 10, and/or a third portion of the machine readable instructions represented by the flowchart of FIG. 7 may be executed by an ASIC. It should be understood that some or all of the circuitry of FIGS. 1 and/or 2 may, thus, be instantiated at the same or different times. Some or all of the circuitry may be instantiated, for example, in one or more threads executing concurrently and/or in series. Moreover, in some examples, some or all of the circuitry of FIGS. 1 and/or 2 may be implemented within one or more virtual machines and/or containers executing on the microprocessor.

In some examples, the processor circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
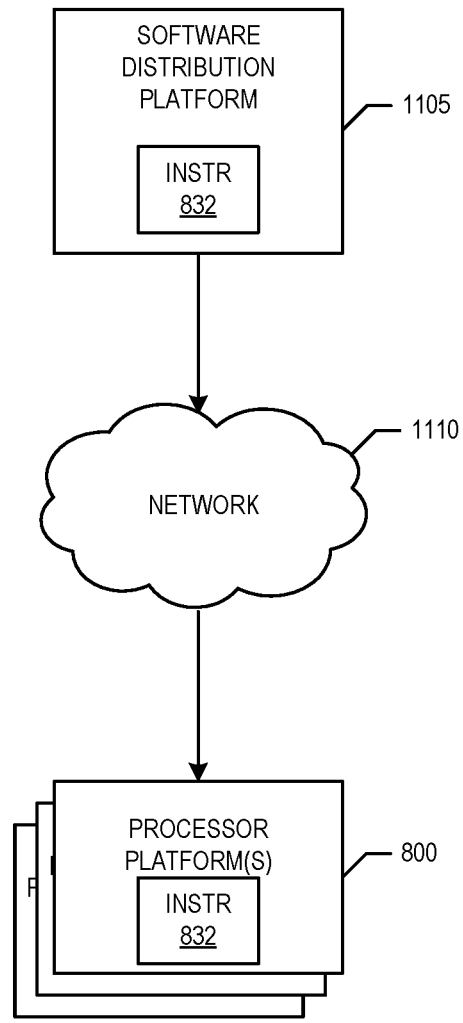
FIG. 11 is a block diagram of an example software distribution platform (e.g., one or more servers) to distribute software (e.g., software corresponding to the example machine readable instructions of FIG. 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions and/or the example operation 700 of FIG. 7, as described above. The one or more servers of the example software distribution platform 1105 are in communication with an example network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions and/or the example operations 700 of FIG. 7, may be downloaded to the example processor platform 800, which is to execute the machine readable instructions 832 to implement the ISP pipeline 100 of FIG. 1 and/or the computation mode control circuitry 116 of FIGS. 1 and/or 2. In some examples, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed that quickly and efficiently switch between modes of operation (e.g., a sleep mode of operation and a wake mode operation). Disclosed examples enable an improved user experience when accessing a compute device while also improving performance (e.g., saving power) during operation of the compute device. For example, disclosed examples (e.g., hardware accelerator circuitry) on one hand facilitates the "always-on" feature when desired (e.g., when a human approaches the compute device) and, on the other hand, reduces power consumption during operation of the compute device.

Additionally, examples disclosed herein (e.g., hardware accelerator circuitry) may be integrated with an IPU SoC and, as such, reduce the computational cost to analyze temporal behavior of a scene (e.g., when a compute device is switched off and/or in an idle state) and to adjust a computation condition of a compute device (e.g., to wake up the compute device) when the example hardware accelerator circuitry detects motion (e.g., based on analysis of low-resolution images (e.g., statistic images)). Also, by processing downscaled, low-resolution images that include very little data as compared to a full-resolution image (e.g., statistic images), examples disclosed herein improve performance.

Furthermore, examples disclosed herein can execute with a camera operating at regular FPS operation or at a reduced (e.g., low) FPS operation. As such, examples disclosed herein offer improved performance while achieving an improved user experience at both regular FPS and reduced FPS. Additionally, examples disclosed herein execute without accessing other components of a compute device (e.g., an external network-on-a-Chip (NoC), external memory (e.g., DDR)).

Accordingly, disclosed systems, methods, apparatus, and articles of manufacture improve the efficiency of using a compute device by reducing power consumption of the compute device when adjusting computation conditions (e.g., modes of operation, such as a wake mode, a sleep mode, etc., a complexity of image processing, etc.) of the compute device while also improving user experience when using the compute device. Example methods, apparatus, and articles of manufacture disclosed herein improve performance of a compute device by detecting a scene change. Such performance improvements include implementing an "always on" or "fast boot" feature that improves the quality of user experience while also optimizing power consumption of a compute device (e.g., with respect to the "always on" or "fast boot" feature). Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to improve performance of a compute device by detecting a scene change are disclosed herein. Further examples and combinations thereof include the following:

Example 1 includes an apparatus to improve performance of a compute device by detecting a scene change, the apparatus comprising interface circuitry to collect data from an image sensor, and first processor circuitry including one or more of at least one of a central processor unit (CPU), a graphics processor unit (GPU), a digital signal processor (DSP), or a microcontroller unit (MCU), the at least one of the CPU, the GPU, the DSP, or the MCU having control circuitry to control data movement within the first processor circuitry, arithmetic and logic circuitry to perform one or more first operations corresponding to instructions including neural network instructions, and one or more registers to store a first result of the one or more first operations, the instructions in the apparatus, a Field Programmable Gate Array (FPGA), the FPGA including first logic gate circuitry, a plurality of configurable interconnections, and storage circuitry, the first logic gate circuitry and the plurality of the configurable interconnections to perform one or more second operations, the storage circuitry to store a second result of the one or more second operations, or Application Specific Integrated Circuitry (ASIC) including second logic gate circuitry to perform one or more third operations, the first processor circuitry to perform at least one of the first operations, the second operations, or the third operations to instantiate scene change detection circuitry to determine a first score value for a first metric of similarity between a first image of a field of view (FOV) of the image sensor and a second image of the FOV, determine a second score value for a second metric of similarity between the first image and the second image, and compute a composite score value based on the first score value and the second score value, and interrupt circuitry to generate an interrupt to second processor circuitry of the compute device to cause the second processor circuitry to adjust a computation condition of the compute device based on the composite score.

Example 2 includes the apparatus of example 1, wherein the first processor circuitry is to perform at least one of the first operations, the second operations, or the third operations to instantiate the interrupt circuitry to compare the composite score value to a threshold value to determine whether to adjust the computation condition, the threshold value corresponding to the scene change, and in response to the composite score value satisfying the threshold value, generate the interrupt to the second processor circuitry.

Example 3 includes the apparatus of any of examples 1 or 2, wherein the computation condition includes at least one of a mode of operation of the compute device, the mode of operation including at least one of a sleep mode of operation or a wake mode of operation, or a complexity of image processing to be performed by the second processor circuitry of the compute device.

Example 4 includes the apparatus of any of examples 1, 2, or 3, wherein the first processor circuitry is to perform at least one of the first operations, the second operations, or the third operations to instantiate the scene change detection circuitry to apply one or more weights to at least one of the first score value or the second score value based on an area of the FOV where the scene change detection circuitry is to detect the scene change, and the interrupt circuitry to, in response to the composite score value satisfying a threshold value corresponding to the scene change, detect the scene change in the area of the FOV between the first image and the second image.

Example 5 includes the apparatus of any of examples 1, 2, 3, or 4, wherein the first image and the second image have respective resolutions that are low relative to a resolution of the image sensor, and the first image is associated with a first sampling interval and the second image is associated with a second sampling interval, the second sampling interval preceding the first sampling interval by a period.

Example 6 includes the apparatus of any of examples 1, 2, 3, 4, or 5, wherein the period corresponds to a single sampling interval.

Example 7 includes the apparatus of any of examples 1, 2, 3, 4, 5, or 6, wherein the scene change detection circuitry is to compute a temporal tracking score value based on an average of the composite score value and one or more composite score values for a threshold number of previous sampling intervals, and the interrupt circuitry is to compare the temporal tracking score value to a threshold value to determine whether to adjust the computation condition, the threshold value corresponding to the scene change.

Example 8 includes a non-transitory computer readable medium comprising instructions that, when executed, cause first processor circuitry to determine a first score for a first metric indicative of similarity between a first image and a second image, the first image and the second image representative of a field of view of an image sensor, determine a second score for a second metric indicative of the similarity between the first image and the second image, compute a composite score based on the first score and the second score, and generate an interrupt to second processor circuitry of a compute device to cause the second processor circuitry to adjust a computation condition of the compute device based on the composite score.

Example 9 includes the non-transitory computer readable medium of example 8, wherein the instructions cause the first processor circuitry to compare the composite score to a threshold to determine whether to adjust the computation condition of the compute device, the threshold corresponding to a scene change, and in response to the composite score satisfying the threshold, generate the interrupt to the second processor circuitry.

Example 10 includes the non-transitory computer readable medium of any of examples 8 or 9, wherein the computation condition includes at least one of an operating mode of the compute device, the operating mode including at least one of a sleep operating mode or a wake operating mode, or a complexity of image processing to be performed by the second processor circuitry.

Example 11 includes the non-transitory computer readable medium of any of examples 8, 9, or 10, wherein the instructions cause the first processor circuitry to apply one or more weights to at least one of the first score or the second score based on an area of the field of view (FOV) in which to detect a scene change, and in response to the composite score satisfying a threshold corresponding to the scene change, detect the scene change in the area of the FOV between the first image and the second image.

Example 12 includes the non-transitory computer readable medium of any of examples 8, 9, 10, or 11, wherein the first image and the second image have respective resolutions that are low relative to a resolution of the image sensor, and the first image was captured during a first sampling interval and the second image was captured during a second sampling interval, the second sampling interval preceding the first sampling interval by a period.

Example 13 includes the non-transitory computer readable medium of any of examples 8, 9, 10, 11, or 12, wherein the period corresponds to a single sampling interval.

Example 14 includes the non-transitory computer readable medium of any of examples 8, 9, 10, 11, 12, or 13, wherein the instructions cause the first processor circuitry to compute a temporal tracking score based on an average of the composite score and one or more composite scores for a threshold number of previous sampling intervals, and compare the temporal tracking score to a threshold to determine whether to adjust the computation condition, the threshold corresponding to a scene change.

Example 15 includes an apparatus to improve performance of a compute device by detecting a scene change, the apparatus comprising means for detecting the scene change by determining first data representative of a first score for a first similarity metric between a first image of a field of view (FOV) of an image sensor and a second image of the FOV, determining second data representative of a second score for a second similarity metric between the first image and the second image, and computing third data representative of a composite score based on the first score and the second score, and means for interrupting processor circuitry of the compute device to cause the processor circuitry to adjust a computation condition of the compute device based on the third data.

Example 16 includes the apparatus of example 15, wherein the means for interrupting is to compare the third data to fourth data representative of a threshold to determine whether to adjust the computation condition of the compute device, the threshold corresponding to the scene change, and in response to the composite score satisfying the threshold, generate an interrupt to the processor circuitry.

Example 17 includes the apparatus of any of examples 15 or 16, wherein the computation condition includes at least one of a mode of operation of the compute device, the mode of operation including at least one of a sleep mode of operation or a wake mode of operation, or a complexity of image processing to be performed by the processor circuitry of the compute device.

Example 18 includes the apparatus of any of examples 15, 16, or 17, wherein the means for detecting the scene change is to apply one or more weights to at least one of the first score or the second score to prioritize an area of the FOV in which to monitor for the scene change, and the means for interrupting is to, in response to the composite score satisfying a threshold corresponding to the scene change, detect the scene change in the area of the FOV between the first image and the second image.

Example 19 includes the apparatus of any of examples 15, 16, 17, or 18, wherein the first image and the second image have respective resolutions that are low relative to a resolution of the image sensor, and the first image corresponds to a first sampling interval and the second image corresponds to a second sampling interval, the second sampling interval preceding the first sampling interval by a period.

Example 20 includes the apparatus of any of examples 15, 16, 17, 18, or 19, wherein the period corresponds to a single sampling interval.

Example 21 includes the apparatus of any of examples 15, 16, 17, 18, 19, or 20, wherein the means for detecting the scene change is to compute a temporal tracking score based on an average of the composite score and one or more composite scores for a threshold number of previous sampling intervals, and the means for interrupting is to compare the temporal tracking score to a threshold to determine whether to adjust the computation condition, the threshold corresponding to the scene change.

Example 22 includes a method for improving performance of a compute device by detecting a scene change, the method comprising determining, by executing an instruction with first processor circuitry, a first score value for a first metric of similarity between a first image of a field of view (FOV) of an image sensor and a second image of the FOV, determining, by executing an instruction with the first processor circuitry, a second score value for a second metric of similarity between the first image and the second image, computing, by executing an instruction with the first processor circuitry, a third score value based on the first score value and the second score value, and generating, by executing an instruction with the first processor circuitry, an interrupt to second processor circuitry of the compute device to cause the second processor circuitry to adjust a computation condition of the compute device based on the third score value.

Example 23 includes the method of example 22, further including comparing the third score value to a threshold value to determine whether to adjust the computation condition, the threshold value corresponding to the scene change, and in response to the third score value satisfying the threshold value, generating the interrupt to the second processor circuitry.

Example 24 includes the method of any of examples 22 or 23, wherein the computation condition includes at least one of an operating mode of the compute device, the operating mode including at least one of a sleep operating mode or a wake operating mode, or a complexity of image processing to be performed by the second processor circuitry of the compute device.

Example 25 includes the method of any of examples 22, 23, or 24, further including applying one or more weights to at least one of the first score value or the second score value to specify an area of the FOV in which to monitor for the scene change, and in response to the third score value satisfying a threshold value corresponding to the scene change, detecting the scene change in the area of the FOV between the first image and the second image.

Example 26 includes the method of any of examples 22, 23, 24, or 25, wherein the first image and the second image have respective resolutions that are low relative to a resolution of the image sensor, and the first image corresponds to a first sampling interval and the second image corresponds to a second sampling interval, the second sampling interval preceding the first sampling interval by a period.

Example 27 includes the method of any of examples 22, 23, 24, 25, or 26, wherein the period corresponds to a single sampling interval.

Example 28 includes the method of any of examples 22, 23, 24, 25, 26, or 27, further including computing a fourth score value based on an average of the third score value and one or more fifth score values for a threshold number of previous sampling intervals, and comparing the fourth score value to a threshold value to determine whether to adjust the computation condition, the threshold value corresponding to the scene change.

Example 29 includes an integrated circuit to improve performance of a compute device by detecting a scene change, the integrated circuit comprising scene change detection circuitry to determine a first score value for a first metric of similarity between a first image of a field of view (FOV) of an image sensor and a second image of the FOV, determine a second score value for a second metric of similarity between the first image and the second image, and compute a third score value based on the first score value and the second score value, and interrupt circuitry to generate an interrupt to processor circuitry of the compute device to cause the processor circuitry to adjust a computation condition of the compute device based on the third score value.

Example 30 includes the integrated circuit of example 29, wherein the interrupt circuitry is to compare the third score value to a threshold value to determine whether to adjust the computation condition, the threshold value corresponding to the scene change, and in response to the third score value satisfying the threshold value, generate the interrupt to the processor circuitry.

Example 31 includes the integrated circuit of any of examples 29 or 30, wherein the computation condition includes at least one of a mode of operation of the compute device, the mode of operation including at least one of a sleep mode of operation or a wake mode of operation, or a complexity of image processing to be performed by the processor circuitry of the compute device.

Example 32 includes the integrated circuit of any of examples 29, 30, or 31, wherein the scene change detection circuitry is to apply one or more weights to at least one of the first score value or the second score value based on an area of the FOV where the scene change detection circuitry is to detect the scene change, and the interrupt circuitry is to, in response to the third score value satisfying a threshold value corresponding to the scene change, detect the scene change in the area of the FOV between the first image and the second image.

Example 33 includes the integrated circuit of any of examples 29, 30, 31, or 32, wherein the first image and the second image have respective resolutions that are low relative to a resolution of the image sensor, and the first image corresponds to a first sampling interval and the second image corresponds to a second sampling interval, the second sampling interval preceding the first sampling interval by a period.

Example 34 includes the integrated circuit of any of examples 29, 30, 31, 32, or 33, wherein the period corresponds to a single sampling interval.

Example 35 includes the integrated circuit of any of examples 29, 30, 31, 32, 33, or 34, wherein the scene change detection circuitry is to compute a fourth score value based on an average of the third score value and one or more fifth score values for a threshold number of previous sampling intervals, and the interrupt circuitry is to compare the fourth score value to a threshold value to determine whether to adjust the computation condition, the threshold value corresponding to the scene change.

Example 36 includes an apparatus to improve performance of a compute device by detecting a scene change, the apparatus comprising one or more memories, machine readable instructions, and first processor circuitry to at least one of instantiate or execute the machine readable instructions to determine a first score for a first metric indicative of similarity between a first image and a second image, the first image and the second image representative of a field of view of an image sensor, determine a second score for a second metric indicative of the similarity between the first image and the second image, compute a composite score based on the first score and the second score, and generate an interrupt to second processor circuitry of the compute device to cause the second processor circuitry to adjust a computation condition of the compute device based on the composite score.

Example 37 includes the apparatus of example 36, wherein the first processor circuitry is to compare the composite score to a threshold to determine whether to adjust the computation condition, the threshold corresponding to the scene change, and in response to the composite score satisfying the threshold, generate the interrupt to the second processor circuitry.

Example 38 includes the apparatus of any of examples 36 or 37, wherein the computation condition includes at least one of an operating mode of the compute device, the operating mode including at least one of a sleep operating mode or a wake operating mode, or a complexity of image processing to be performed by the second processor circuitry.

Example 39 includes the apparatus of any of examples 36, 37, or 38, wherein the first processor circuitry is to apply one or more weights to at least one of the first score or the second score based on an area of the field of view (FOV) in which to detect the scene change, and in response to the composite score satisfying a threshold corresponding to the scene change, detect the scene change in the area of the FOV between the first image and the second image.

Example 40 includes the apparatus of any of examples 36, 37, 38, or 39, wherein the first image and the second image have respective resolutions that are low relative to a resolution of the image sensor, and the first image was captured during a first sampling interval and the second image was captured during a second sampling interval, the second sampling interval preceding the first sampling interval by a period.

Example 41 includes the apparatus of any of examples 36, 37, 38, 39, or 40, wherein the period corresponds to a single sampling interval.

Example 42 includes the apparatus of any of examples 36, 37, 38, 39, 40, or 41, wherein the first processor circuitry is to compute a temporal tracking score based on an average of the composite score and one or more composite scores for a threshold number of previous sampling intervals, and compare the temporal tracking score to a threshold to determine whether to adjust the computation condition, the threshold corresponding to the scene change.

Example 43 includes a non-transitory machine readable medium comprising scene change detection instructions to cause one or more machines to determine a first score value for a first metric of similarity between a first image of a field of view (FOV) of an image sensor and a second image of the FOV, determine a second score value for a second metric of similarity between the first image and the second image, and compute a composite score value based on the first score value and the second score value, and interrupt instructions to generate an interrupt to processor circuitry of a compute device to cause the processor circuitry to adjust a computation condition of the compute device based on the composite score value.

Example 44 includes the non-transitory machine readable medium of example 43, wherein the interrupt instructions are to cause the one or more machines to compare the composite score value to a threshold value to determine whether to adjust the computation condition of the compute device, the threshold value corresponding to a scene change, and in response to the composite score value satisfying the threshold value, generate the interrupt to the processor circuitry.

Example 45 includes the non-transitory machine readable medium of any of examples 43 or 44, wherein the computation condition includes at least one of a mode of operation of the compute device, the mode of operation including at least one of a sleep mode of operation or a wake mode of operation, or a complexity of image processing to be performed by the processor circuitry of the compute device.

Example 46 includes the non-transitory machine readable medium of any of examples 43, 44, or 45, wherein the scene change detection instructions are to cause the one or more machines to apply one or more weights to at least one of the first score value or the second score value based on an area of the FOV in which to detect a scene change, and the interrupt instructions are to cause the one or more machines to, in response to the composite score value satisfying a threshold value corresponding to the scene change, detect the scene change in the area of the FOV between the first image and the second image.

Example 47 includes the non-transitory machine readable medium of any of examples 43, 44, 45, or 46, wherein the first image and the second image have respective resolutions that are low relative to a resolution of the image sensor, and the first image is associated with a first sampling interval and the second image is associated with a second sampling interval, the second sampling interval preceding the first sampling interval by a period.

Example 48 includes the non-transitory machine readable medium of any of examples 43, 44, 45, 46, or 47, wherein the period corresponds to a single sampling interval.

Example 49 includes the non-transitory machine readable medium of any of examples 43, 44, 45, 46, 47, or 48, wherein the scene change detection instructions are to cause the one or more machines to compute a temporal tracking score value based on an average of the composite score value and one or more composite score values for a threshold number of previous sampling intervals, and the interrupt instructions are to cause the one or more machines to compare the temporal tracking score value to a threshold value to determine whether to adjust the computation condition, the threshold value corresponding to a scene change.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to improve performance of a compute device by detecting a scene change, the apparatus comprising:
    interface circuitry to collect data from an image sensor; and
    first processor circuitry including one or more of:
        at least one of a central processor unit (CPU), a graphics processor unit (GPU), a digital signal processor (DSP), or a microcontroller unit (MCU), the at least one of the CPU, the GPU, the DSP, or the MCU having control circuitry to control data movement within the first processor circuitry, arithmetic and logic circuitry to perform one or more first operations corresponding to instructions including neural network instructions, and one or more registers to store a first result of the one or more first operations, the instructions in the apparatus;
        a Field Programmable Gate Array (FPGA), the FPGA including first logic gate circuitry, a plurality of configurable interconnections, and storage circuitry, the first logic gate circuitry and the plurality of the configurable interconnections to perform one or more second operations, the storage circuitry to store a second result of the one or more second operations; or
        Application Specific Integrated Circuitry (ASIC) including second logic gate circuitry to perform one or more third operations;
    the first processor circuitry to perform at least one of the first operations, the second operations, or the third operations to instantiate:
        scene change detection circuitry to:
            determine a first score value for a first metric of similarity between a first image of a field of view (FOV) of the image sensor and a second image of the FOV;
            determine a second score value for a second metric of similarity between the first image and the second image; and
            compute a composite score value based on the first score value and the second score value; and
        interrupt circuitry to, based on the composite score, generate an interrupt to second processor circuitry of the compute device to cause the second processor circuitry to adjust power consumption of the compute device by at least one of (a) transitioning between a sleep mode of operation and a wake mode of operation or (b) adjusting a complexity of image processing to be performed by the second processor circuitry.

2. The apparatus of claim 1, wherein the first processor circuitry is to perform at least one of the first operations, the second operations, or the third operations to instantiate the interrupt circuitry to:
    compare the composite score value to a threshold value to determine whether to adjust the power consumption, the threshold value corresponding to the scene change; and
    based on the composite score value satisfying the threshold value, generate the interrupt to the second processor circuitry.

3. The apparatus of claim 1, wherein the first processor circuitry is to perform at least one of the first operations, the second operations, or the third operations to instantiate:
    the scene change detection circuitry to apply one or more weights to at least one of the first score value or the second score value based on an area of the FOV where the scene change detection circuitry is to detect the scene change; and
    the interrupt circuitry to, based on the composite score value satisfying a threshold value corresponding to the scene change, detect the scene change in the area of the FOV between the first image and the second image.

4. The apparatus of claim 1, wherein the first image has a first resolution that is low relative to a resolution of the image sensor, the second image has a second resolution that is low relative to the resolution of the image sensor, the first image is associated with a first sampling interval, and the second image is associated with a second sampling interval, the second sampling interval preceding the first sampling interval by a period.

5. The apparatus of claim 4, wherein the period corresponds to a single sampling interval.

6. The apparatus of claim 1, wherein:
    the scene change detection circuitry is to compute a temporal tracking score value based on an average of the composite score value and one or more composite score values for a threshold number of previous sampling intervals; and
    the interrupt circuitry is to compare the temporal tracking score value to a threshold value to determine whether to adjust the power consumption, the threshold value corresponding to the scene change.

7. The apparatus of claim 1, wherein:
the first metric of similarity corresponds to a sum of differences between the first image and the second image; and
the second metric of similarity corresponds to a structural similarity between the first image and the second image.

8. A non-transitory computer readable medium comprising instructions that, when executed, cause first processor circuitry to:
determine a first score for a first metric indicative of similarity between a first image and a second image, the first image and the second image representative of a field of view of an image sensor;
determine a second score for a second metric indicative of the similarity between the first image and the second image;
compute a composite score based on the first score and the second score; and
based on the composite score, generate an interrupt to second processor circuitry of a compute device to cause the second processor circuitry to adjust power consumption of the compute device by at least one of (a) transitioning between a sleep mode of operation and a wake mode of operation or (b) adjusting a complexity of image processing to be performed by the second processor circuitry.

9. The non-transitory computer readable medium of claim 8, wherein the instructions cause the first processor circuitry to:
compare the composite score to a threshold to determine whether to adjust the power consumption of the compute device, the threshold corresponding to a scene change; and
based on the composite score satisfying the threshold, generate the interrupt to the second processor circuitry.

10. The non-transitory computer readable medium of claim 8, wherein the instructions cause the first processor circuitry to:
apply one or more weights to at least one of the first score or the second score based on an area of the field of view (FOV) in which to detect a scene change; and
based on the composite score satisfying a threshold corresponding to the scene change, detect the scene change in the area of the FOV between the first image and the second image.

11. The non-transitory computer readable medium of claim 8, wherein the first image has a first resolution that is low relative to a resolution of the image sensor, the second image has a second resolution that is low relative to the resolution of the image sensor, the first image was captured during a first sampling interval, and the second image was captured during a second sampling interval, the second sampling interval preceding the first sampling interval by a period.

12. The non-transitory computer readable medium of claim 11, wherein the period corresponds to a single sampling interval.

13. The non-transitory computer readable medium of claim 8, wherein the instructions cause the first processor circuitry to:
compute a temporal tracking score based on an average of the composite score and one or more composite scores for a threshold number of previous sampling intervals; and
compare the temporal tracking score to a threshold to determine whether to adjust the power consumption, the threshold corresponding to a scene change.

14. An apparatus to improve performance of a compute device by detecting a scene change, the apparatus comprising:
means for detecting the scene change by determining first data representative of a first score for a first similarity metric between a first image of a field of view (FOV) of an image sensor and a second image of the FOV, determining second data representative of a second score for a second similarity metric between the first image and the second image, and computing third data representative of a composite score based on the first score and the second score; and
means for interrupting processor circuitry of the compute device based on the third data, the means for interrupting the processor circuitry to cause the processor circuitry to adjust power consumption of the compute device by at least one of (a) transitioning between a sleep mode of operation and a wake mode of operation or (b) adjusting a complexity of image processing to be performed by the processor circuitry.

15. The apparatus of claim 14, wherein the means for interrupting is to:
compare the third data to fourth data representative of a threshold to determine whether to adjust the power consumption of the compute device, the threshold corresponding to the scene change; and
based on the composite score satisfying the threshold, generate an interrupt to the processor circuitry.

16. The apparatus of claim 14, wherein:
the means for detecting the scene change is to apply one or more weights to at least one of the first score or the second score to prioritize an area of the FOV in which to monitor for the scene change; and
the means for interrupting is to, based on the composite score satisfying a threshold corresponding to the scene change, detect the scene change in the area of the FOV between the first image and the second image.

17. The apparatus of claim 14, wherein the first image has a first resolution that is low relative to a resolution of the image sensor, the second image has a second resolution that is low relative to the resolution of the image sensor, the first image corresponds to a first sampling interval, and the second image corresponds to a second sampling interval, the second sampling interval preceding the first sampling interval by a period.

18. The apparatus of claim 17, wherein the period corresponds to a single sampling interval.

19. The apparatus of claim 14, wherein:
the means for detecting the scene change is to compute a temporal tracking score based on an average of the composite score and one or more composite scores for a threshold number of previous sampling intervals; and
the means for interrupting is to compare the temporal tracking score to a threshold to determine whether to adjust the power consumption, the threshold corresponding to the scene change.

20. A method for improving performance of a compute device by detecting a scene change, the method comprising:
determining, by executing an instruction with first processor circuitry, a first score value for a first metric of similarity between a first image of a field of view (FOV) of an image sensor and a second image of the FOV;

determining, by executing an instruction with the first processor circuitry, a second score value for a second metric of similarity between the first image and the second image;

computing, by executing an instruction with the first processor circuitry, a third score value based on the first score value and the second score value; and generating, by executing an instruction with the first processor circuitry, an interrupt to second processor circuitry of the compute device based on the third score value, the interrupt to cause the second processor circuitry to adjust power consumption of the compute device by at least one of (a) transitioning between a sleep mode of operation and a wake mode of operation or (b) adjusting a complexity of image processing to be performed by the compute device.

21. The method of claim 20, further including:

comparing the third score value to a threshold value to determine whether to adjust the power consumption, the threshold value corresponding to the scene change; and based on the third score value satisfying the threshold value, generating the interrupt to the second processor circuitry.

22. The method of claim 20, further including:

applying one or more weights to at least one of the first score value or the second score value to specify an area of the FOV in which to monitor for the scene change; and based on the third score value satisfying a threshold value corresponding to the scene change, detecting the scene change in the area of the FOV between the first image and the second image.

23. The method of claim 20, wherein the first image has a first resolution that is low relative to a resolution of the image sensor, the second image has a second resolution that is low relative to the resolution of the image sensor, the first image corresponds to a first sampling interval, and the second image corresponds to a second sampling interval, the second sampling interval preceding the first sampling interval by a period.

24. The method of claim 23, wherein the period corresponds to a single sampling interval.

25. The method of claim 20, further including:

computing a fourth score value based on an average of the third score value and one or more fifth score values for a threshold number of previous sampling intervals; and comparing the fourth score value to a threshold value to determine whether to adjust the power consumption, the threshold value corresponding to the scene change.

* * * * *